United States Patent
Musatenko et al.

(10) Patent No.: US 9,305,240 B2
(45) Date of Patent: Apr. 5, 2016

(54) MOTION ALIGNED DISTANCE CALCULATIONS FOR IMAGE COMPARISONS

(71) Applicant: GOOGLE TECHNOLOGY HOLDINGS LLC, Mountain View, CA (US)

(72) Inventors: Yuriy S. Musatenko, Kyiv (UA); Michael Jason Mitura, Carrollton, TX (US); Vitalii Dziuba, Kyiv (UA); Taras Vozniuk, Kyiv (UA); Laurent Gil, San Francisco, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 352 days.

(21) Appl. No.: 13/706,370

(22) Filed: Dec. 6, 2012

(65) Prior Publication Data

US 2013/0148860 A1 Jun. 13, 2013

Related U.S. Application Data

(60) Provisional application No. 61/568,113, filed on Dec. 7, 2011.

(51) Int. Cl.
*G06K 9/00* (2006.01)
*G06K 9/62* (2006.01)

(52) U.S. Cl.
CPC .......... *G06K 9/6206* (2013.01); *G06K 9/00228* (2013.01)

(58) Field of Classification Search
None
See application file for complete search history.

(56) References Cited

U.S. PATENT DOCUMENTS

| 5,406,642 | A | 4/1995 | Maruya | |
|---|---|---|---|---|
| 2006/0188159 | A1 | 8/2006 | Shiiyama | |
| 2009/0141947 | A1* | 6/2009 | Kyyko et al. | 382/118 |
| 2010/0284577 | A1 | 11/2010 | Hua et al. | |
| 2011/0249092 | A1* | 10/2011 | Jacobs et al. | 348/43 |
| 2012/0275642 | A1* | 11/2012 | Aller et al. | 382/100 |

OTHER PUBLICATIONS

Fan L et al.: "A Combined Feature-Texture Similarity Measure for Face Alignment Under Varying Pose", Proceedings 2000 IEEE Conference on Computer Vision and Pattern Recognition, CVPR 2000, Hilton Head Island, SC, Jun. 13-15, 2000; [Proceedings of the IEEE Computer Conference on Computer Vision and Pattern Recognition], Los Alamitos, CA: IEEE Comp., Jun. 13, 2000, pp. 308-313.

(Continued)

*Primary Examiner* — Weiwen Yang
(74) *Attorney, Agent, or Firm* — Morris & Kamlay LLP

(57) ABSTRACT

Image comparison techniques allow a quick method of recognizing and identifying faces or other objects appearing in images. A series of quick distance calculations can be performed between an unknown input image and a reference image. These calculations may include facial detection, normalization, discrete cosine transform calculations, and threshold comparisons to determine whether an image is recognized. In the case of identification uncertainty, slower but more precise motion aligned distance calculations are initiated. Motion aligned distance calculations involve generating a set of downscaled images, determining motion field and motion field-based distances between an unknown input image and reference image, best scale factors for aligning an unknown input image with reference images, and calculating affine transformation matrices to modify and align an unknown input image with reference images.

25 Claims, 14 Drawing Sheets

(56) References Cited

OTHER PUBLICATIONS

Shin et al.: "Generalized elastic graph matching for face recognition", Pattern Recognition Letters, Elsevier, Amsterdam, N., vol. 28, No. 9, Apr. 14, 2007, pp. 1077-1082.

Patent Cooperation Treaty, International Search Report and Written Opinion of the International Searching Authority for International Application No. PCT/US2012/068341 (VIE00005), Mar. 15, 2013, 13 pages.

* cited by examiner

MOTION ALIGNED DISTANCE CALCULATIONS FOR IMAGE COMPARISONS

CROSS REFERENCE TO RELATED APPLICATIONS

This application claims the benefit of U.S. Provisional Application No. 61/568,113, filed Dec. 7, 2011, which is incorporated herein by reference in its entirety.

FIELD OF ART

The present disclosure generally related to the field of image comparisons and more specifically to the recognition of an object within an image based on the comparisons.

BACKGROUND

Existing image comparison techniques often produce unreliable recognition results due to variations in lighting, scale and other factors such as errors in the normalization of the image being recognized. In addition, many existing techniques are computationally expensive. Consequently, existing techniques are difficult to realize on devices such as personal computers, mobile phones and cameras.

Additionally, media capturing, editing and viewing products often include options for users to annotate, categorize or otherwise organize images and videos within a digital media library. Users browse or search through their digital libraries according to these rubrics to view and upload media to the web. A user's success in finding a desired image or video they wish to experience or share is directly related to the quality in which their digital library was organized. Oftentimes, however, users do not have the time or the energy to organize their digital media library which negatively impacts their view of the product and ability to find desired media. Developers have had difficulty providing useful organization tools to users based on recognition of objects within a media collection.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

For the purposes of this disclosure, the motion aligned distance calculations are applied to compare facial images, such as that of humans, as an example. However, those skilled in the art will recognize that the method may also be applied for comparing and recognizing images containing other objects, both animate and inanimate. Some example entities that may be recognized are people, realistic (or unrealistic) CGI characters or other animate objects (e.g., a dog or horse) or inanimate objects (e.g., a car or house) having an identifiable set of features (e.g., the grille, headlights, rear, badge, profile, etc., of a car being equivalent to the profile or facial features such as the eyes, mouth, etc., of animate objects). From hereon, a variety of embodiments are described in the context of faces such as those of people, however, as explained above, these methods may apply to facial images representing facial fronts of other entities (both animate and inanimate) having recognizable features.

Configuration Overview

In one example embodiment, a system (and a method) is configured to normalize an input image. The system in a first stage performs a fast calculation of distance between blocks using DCTs (Discrete Cosine Transforms). When the distance is outside of a range defined by a pair of thresholds, the input image can be recognized or rejected with a large degree of certainty. A second stage can be used for further processing to determine an identification of the image in the case of uncertainty. Embodiments of the second stage include motion-aligned distance calculations, which may include finding best scaling factors, affine transformation matrices, and other distance calculation methods. In some embodiments, cascade based distance calculations are performed and a motion-aligned field determines a best-fit alignment for one or more image comparisons.

Reduction of Ambiguity

Figure 1:
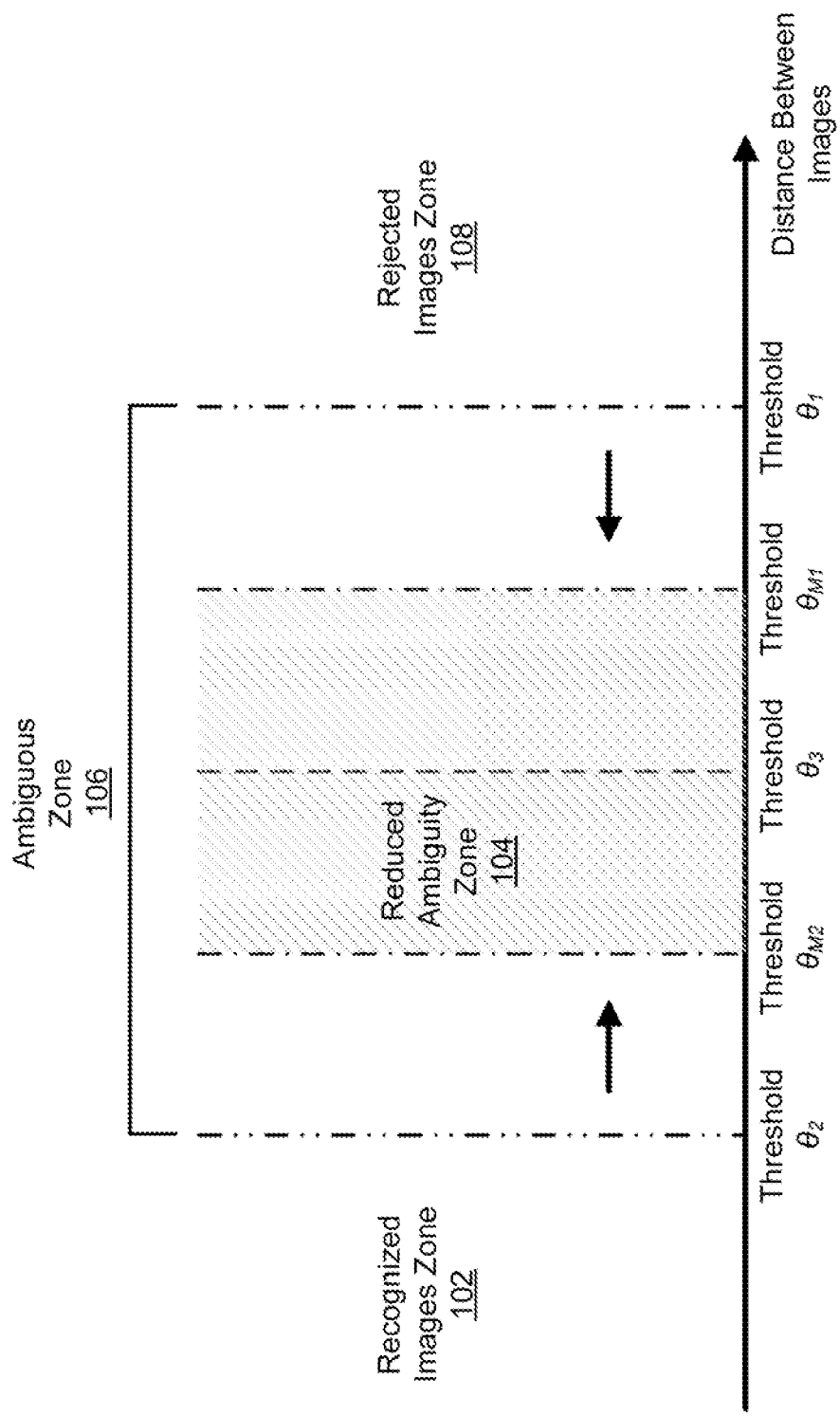
FIG. 1 is a diagram illustrating thresholds correlating to recognition of an image in response to one or more image comparisons, in accordance with an example embodiment.

Referring now to FIG. 1, a diagram illustrates thresholds correlating to recognition of an image in response to one or more image comparisons, in accordance with an embodiment. As shown, there may be multiple zones for classifying compared images (e.g., as recognized or not) based on a distance between the images. As the distance between two compared images increases, the two images are less likely to both contain the same person, object, etc., for a positive recognition. Threshold distances θ may define the boundaries of each zone for classifying the compared images.

In one example embodiment, an input image (e.g., an unknown image to be recognized) is received and compared to references images (e.g., a set of known images). When an unknown image is compared to reference images, a quick calculation may determine an initial distance between the unknown image and a given reference image. If the initial distance is less than threshold $\theta_2$, the boundary for the recognized images zone 102, then the unknown image may be recognized as the object or individual represented by the given reference image with a minimal degree of uncertainty.

Conversely, if the initial distance is greater than threshold $\theta_1$, the boundary for the rejected image zone 108, then the unknown image is not recognized as the given reference image with a minimal degree of uncertainty. However, an initial distance may indicate that an image falls between thresholds $\theta_1$ and $\theta_2$, thus belonging to an ambiguous zone 106 with a large degree of uncertainty for performing a recognition (or rejection). In other words, initial distances in this zone cannot be trusted to positively or negatively recognize an unknown input image as a given reference image without a large degree of uncertainty.

Typically, a number of image comparisons fall within the ambiguous zone 106 for fast comparison processes. Accordingly, additional calculations are performed to decrease the size of the ambiguous zone 106. Conceptually, the additional calculations decrease the distance between the thresholds $\theta_1$, $\theta_2$ used in the initial comparison to reduce the size of the ambiguity zone 106. Hence, the reduced ambiguity zone 104 may be defined by thresholds $\theta_{M1}$ and $\theta_{M2}$ that converge on a threshold $\theta_3$ as additional image comparisons more precisely recognize an image.

Though the additional calculations are more precise, as a tradeoff, they may also require additional processing time and/or greater computation power to perform. Accordingly, the objective is to reduce the ambiguity zone 106 to a point where thresholds $\theta_{M1}$ and $\theta_{M2}$ converge on threshold $\theta_3$ without inordinately incurring additional processing time or requiring further processing power. One example embodiment of a more precise calculation involves computing a motion aligned distance.

Image Processor Components

Figure 2:
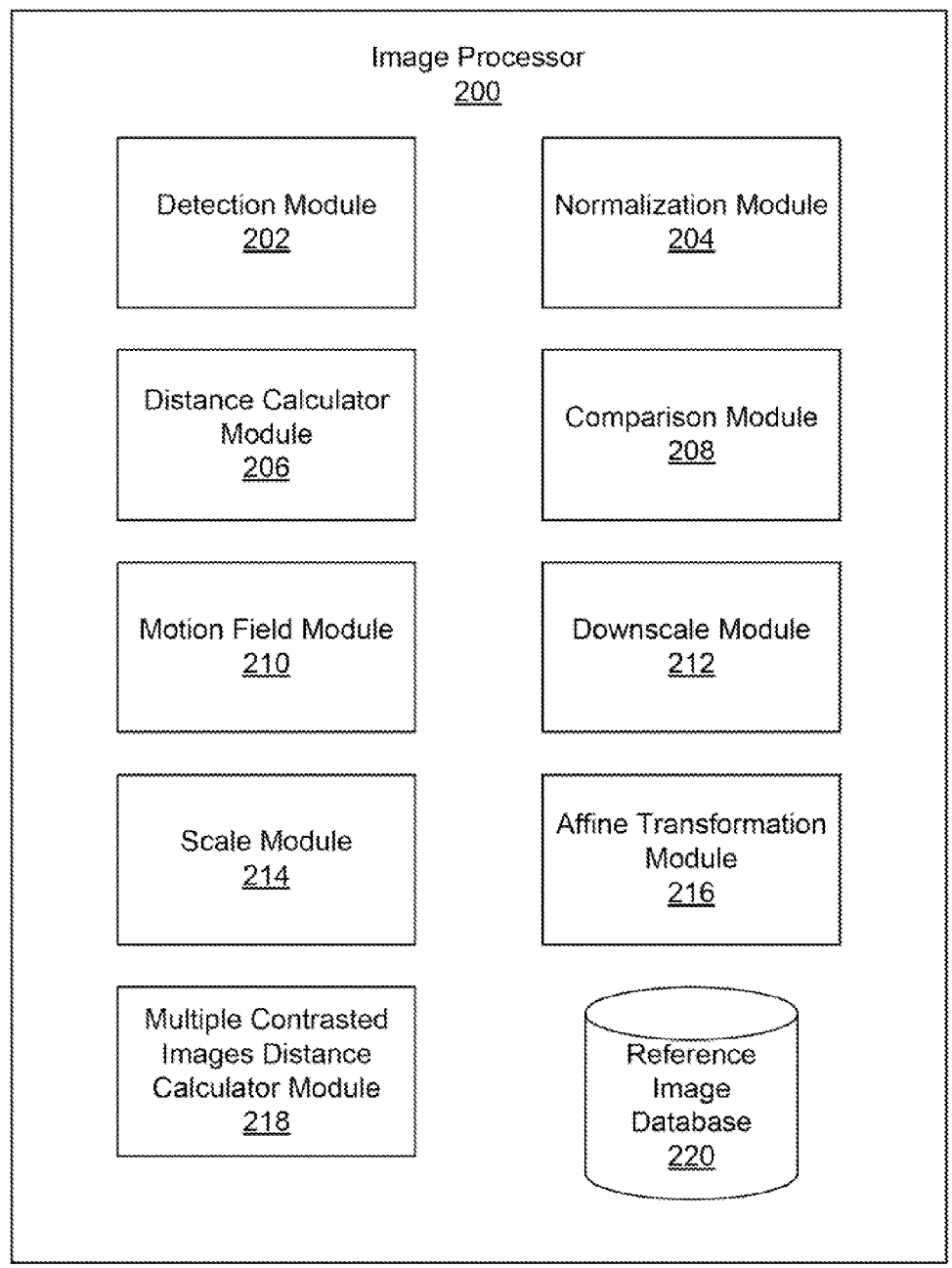
FIG. 2 is a block diagram illustrating the various components of an image processor, in accordance with an example embodiment.

Next, FIG. 2 is a block diagram illustrating the various components of an image processor 200, in accordance with an embodiment. The image processor 200 includes a detection module 202, normalization module 204, distance calculator module 206, comparison module 208, motion field module 210, downscale module 212, scale module 214, affine transformation module 216, multiple contrasted images distance calculator module 218, and reference image database 220. Other embodiments of image processor 200 may have a fewer modules or other modules than those illustrated in FIG. 2.

The detection module 202, in an embodiment, may scan incoming images to detect the presence of facial features for recognizing individuals. For example, the detection module 202 may be able to detect changes in pixel contrasts and patterns to determine the location of eyes in the image. Using the eye coordinates, the detection module 202 may estimate regions where other facial features, such as the nose, mouth, etc., are located. Upon discovery of expected facial features, the detection module 202 may determine that the image contains a face and extract the facial region of the image for further processing. Other embodiments of the detection module 202 may be configured to detect the presence of other features for recognizing and distinguishing between different types of cars, animals, etc.

The normalization module 204, in an embodiment, may analyze a facial image and determine parameters for normalizing the image in preparation for comparing the facial image with reference images. The reference images may be normalized using similar techniques. In an embodiment, normalization operations may include, but is not limited to, scaling, re-orientation, brightness adjustments, and contrast adjustments. For example, an incoming facial image may be 500× 500 pixels in size and reference facial images are 100×100 pixels in size. As comparisons between differently sized images may be inaccurate and computing intensive, the normalization module 204 rescales the incoming image to 100× 100 pixels to allow a 1:1 comparison. The incoming image may also be rotated so that the eyes are horizontally level to match the orientation of reference images.

A distance calculator module 206, in an embodiment, determines a distance between two facial images. The distance value generated indicates how similar or different the two images are to each other, with higher values indicating a greater difference between the images. Different embodiments of the distance calculator module 206 may use various techniques for calculating distances. For example, one embodiment may use a discrete cosine transform (DCT) to calculating distances between corresponding pixel blocks of two images. Accordingly, the distance value may comprise a weighted sum of the resulting distances between the different pixel blocks.

A comparison module 208, in an embodiment, compares distances calculated by the distance calculator module 206 with threshold values to determine whether a facial image is positively recognized, negatively recognized, or if additionally processing should be performed to determine the identity of a facial image. In various embodiments, the threshold values may be automatically generated through machine learning based on a database of known images, or it may be set by an operator.

A motion field module 210, in an embodiment, generates a motion field describing the best method for modifying facial features on an image to better align it with reference images for purposes of comparisons and distance calculations. The motion field generated for an image may comprise a number of motion field vectors that describe, for different regions of an image, direction and magnitude for shifting various points on the image to best align it with a given reference image. Prior to generating the motion field, the motion field module 210 may perform center point alignment by aligning two images based on a center point and begin calculating motion field vectors relative to the center point. The center point may be determined from features common to the compared images, the physical center point of each image, or defined in the normalization process. For example, the center point may be selected as the center of a triangle formed by the mouth and eyes of a facial image. In an embodiment, the process may involve overlapping two images at the center point and dividing each image into specifically sized blocks. The motion field module 210 compares corresponding blocks from each image to determine a change in displacement of a given block (e.g., relative to the center point) in one image that yields a best alignment with the corresponding block in the other image. In turn, the motion field generated for an input image describes changes within the input image (e.g., at each block location) that produce a best alignment with a reference image. The motion field module 210 may use the motion field in comparisons for determining a distance between the two images.

High quality images may provide more information than is needed for performing accurate comparisons. Additionally comparing high quality images typically requires more computing resources than lower quality images. Consequently, images may be downscaled prior to performing a comparison. Downscaling causes a loss of some fine details in an image for the benefit of a faster computation and recognition time. Furthermore, as some fine detail in images may not be necessary for image recognition, the downscaling may not affect the final result of the comparison.

In an embodiment, the downscale module 212 helps to reduce the image processor's 200 workload by downscaling images prior to their comparison. Downscaling may involve discarding visual data in the image or otherwise reducing the resolution of the image. For example, the dimensions of an image may be reduce from 500×500 pixels to 100×100 pixels or the image data may be compressed. In addition to reducing the physical size of an image, downscaling may also involve image compression, in which the quality of an image is reduced to reduce the file size of an image (and thus the amount of data used for comparisons). The downscale module 212 may determine a degree of downscaling for a given image in real time based on the workload of the image processor 200.

The scale module 214, in an embodiment, may be used to determine a rescaling factor of an image for performing one or more comparisons with a reference image. The scale module 214 is able to resize an image's dimensions (e.g., enlarging an image or shrinking an image) to varying degrees. For example, the scale module 214 may generate a scaled set of five images (e.g., ranging from a factor of 0.8 to 1.2 the size the size of the original image) to compare with a reference image. The scale module 214 may determine a best scale factor by identifying the scaled facial image that has the least distance from the reference image. The scale module 214 may also perform any image resizing operation necessary in image processor 200.

The affine transformation module 216, in an embodiment, generates affine transformation matrices for changing facial images to more closely align with a reference image, thus allowing for a more accurate comparison. Each facial image may be composed of a number of points, which may be identified by coordinates on the image. Affine transformation matrices identify the best way to shift each of these points so as to align and transform an unknown image with a reference image. The affine transformation matrix may be calculated using various factors, including a best scale value, motion fields, convolutions and the like. The affine transformation module 216 is used to find the best affine transformation that minimizes the differences of the displacements used for matching the images. These displacements may be best represented using vectors from motion field calculations. The affine transformation module 216 may also be used to apply the matrix transformations to the images in preparation for later image comparisons and distance calculations.

The multiple contrasted images distance calculator module 218, in an embodiment, may determine estimated mean values and standard deviations of pixels of an unknown image for recognition. Under some circumstances, unknown images may not be accurately compared with reference images due to significant differences in image contrast. By creating a set of images with differing contrasts and comparing the unknown images with reference images, the image with the best matching contrast level may be identified. In addition to identifying a best matching contrast level for the image, the multiple contrasted images distance calculate module 218 may identify regions within the image that exceed (e.g., by one or more standard deviations) the best mean contrast level. In turn, the contrast of the areas may be adjusted within a threshold level standard deviation from the best mean contrast level. Using the best mean values and standard deviations for the unknown image, an accurate motion aligned distance may be calculated. Motion aligned distance values calculated using the multiple contrasted images distance calculator module 218 may be used to more accurately compare and recognize an image.

The reference image database 220, in an embodiment, stores reference images that are used for image comparisons. When image processor 200 receives new incoming facial images for recognition (e.g., unknown images), modules within the image processor 200 access the reference image database 220 to retrieve reference images used in comparisons and other calculations described herein. Reference images stored in reference image database 220 may be updated or replaced with higher quality or more representative images for individuals from identified incoming facial images.

Image Comparison Overview

Figure 3:
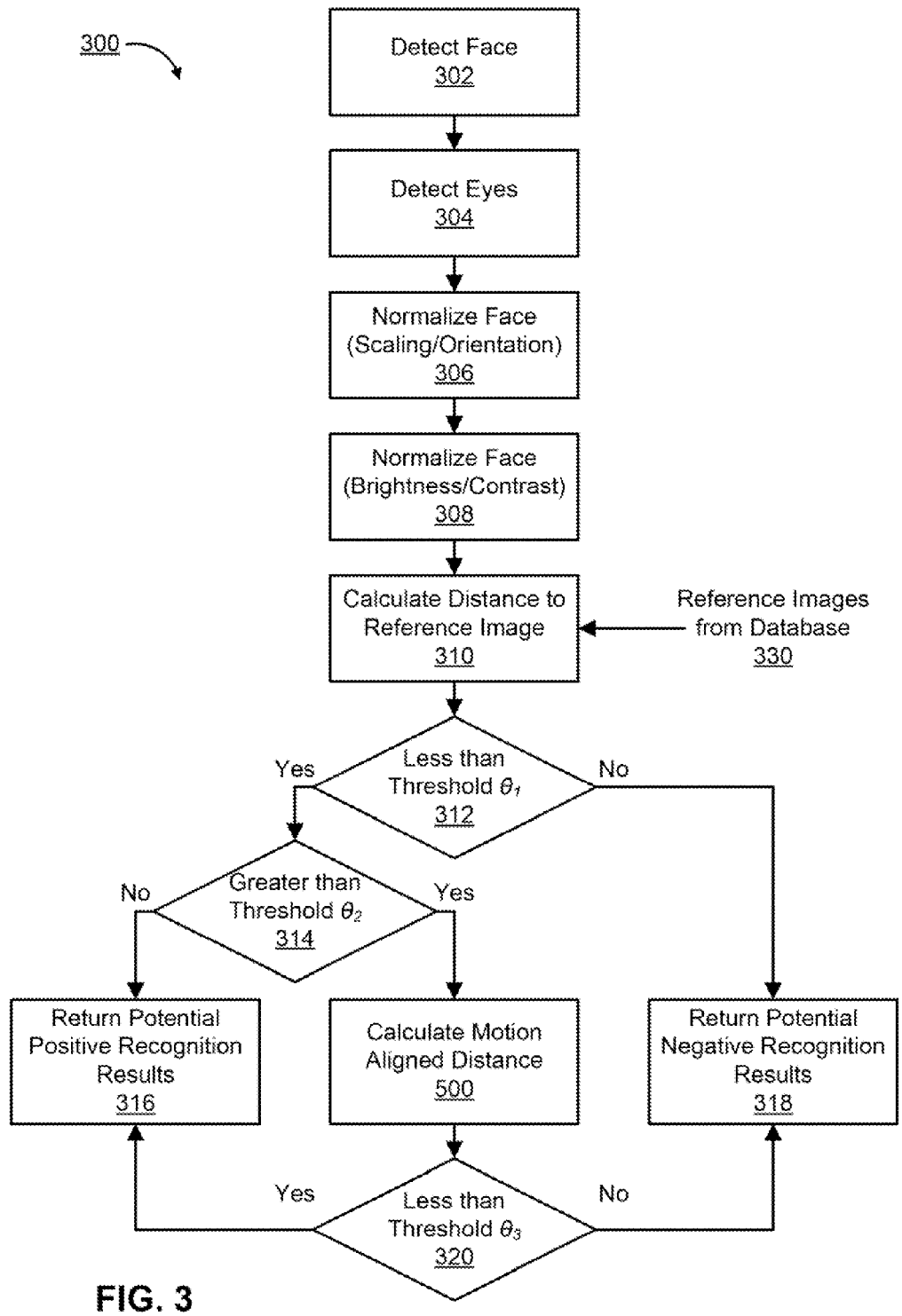
FIG. 3 is a flow chart illustrating a method for performing an example initial comparison of images, in accordance with an example embodiment.

FIG. 3 is a flow chart illustrating a method for performing an example initial comparison of images, in accordance with an embodiment. In other embodiments, other entities may be identified.

In an example embodiment, the steps for identification of a person by a facial image using a motion aligned field may include the following steps:
  localization 302 of the facial image;
  detection 304 of eyes on the face;
  normalization 306 of the facial image by scaling and rotation so that coordinates of eyes centers in the facial image have certain fixed values;
  normalization 308 of the image based on the brightness and contrast;
  initial comparisons of normalized input and reference images 330 from the database 220 and calculation 310 of distances;
  rough determination 312, 314 of whether input image is recognized, rejected, or needs further calculations;
  if necessary, computation 500 of motion-aligned distances between the normalized input and reference images from the database, obtained distances are computed on the basis of DCT features using motion field for best aligning of images;

comparison of distances between the normalized input image and reference images; and determining recognition of an input facial image based on the compared distances.

In an embodiment, detection 302 of faces in the image is based on the "AdaBoost" (Adaptive Boosting) process. First, rectangles covering quasi-frontal faces in the image are defined. Then, the positions of faces in the image are defined more precisely within the limits of each previously determined rectangle. Such definition may be based on detection 304 of the eye pupil centers. Eye pupil centers may still be detected even if the faces are oriented differently or if the eyes are narrowed or closed.

Before comparing an input facial image with a reference image, the images may be normalized 306 to a standard form, in which the coordinates of the eye pupil centers in the image have certain fixed values. For example, the pupil centers may be aligned so that they are along a horizontal axis. In an embodiment, such normalization 306 may be performed by rotating and scaling the image.

The angle of image rotation is calculated by equation (1):

$$a = -\tan^{-1}\left(\frac{b_y}{b_x}\right),$$

where b is the vector connecting eye pupil centers.

The zooming coefficient is calculated by equation (2):

$$t = \frac{\text{eye\_dist}}{|b|},$$

where eyes_dist is the fixed distance between centers of eye pupils.

To reduce the influence of lighting conditions on facial image comparisons and the results of recognition, images may be normalized 308 by brightness, in an embodiment, by the following two methods:

image histogram equalization and/or normalization by local contrast.

In an example embodiment, normalization of images by histogram equalization is invariant to any monotone function of brightness of image pixels, including transformations of brightness. Under such conditions, the order of pixels by value of their brightness is preserved, and changes happen only in the values themselves. If the input image histogram has any peaks, these peaks will be preserved on the histogram of normalized image (e.g., equalization does not affect the general form of histogram, and only extends it along the whole interval [0, 255]).

The process of image normalization 308 by brightness, which uses a non-linear equalization of the histogram, may include the following steps.

1. The histogram h(j) of brightness of image pixels f(x, y) may be determined from equation (3):

$$h(j) = \sum_{x,y} [f(x, y), j],$$

where $$[f(x, y), j] = \begin{cases} 1, & \text{if } f(x, y) = j \\ 0, & \text{if } f(x, y) \neq j \end{cases}.$$

2. The cumulative histogram C(i) may be determined from equation (4):

$$C(i) = \sum_{j=1}^{i} (h(j))^r,$$

where r is a parameter determining degree of nonlinearity. For normalization of facial images, r=0.5 or r=1 is used.

3. New values of image pixel brightness may be determined from equation (5):

$$f_{norm}(x, y) = \frac{C(f(x, y))}{C(255)} \cdot 255.$$

4. Local contrast Lc(x, y) in pixel (x, y) may be determined from equation (6) as a ratio of this pixel brightness and average image brightness within a predetermined neighborhood:

$$Lc(x, y) = \begin{cases} f_c(x, y), & \text{if } f_c(x, y) \leq 1 \\ 2 - \dfrac{1}{f_c(x, y)}, & \text{if } f_c(x, y) > 1 \end{cases},$$

$$f_c(x, y) = \frac{f(x, y)}{f(x, y) \otimes K}.$$

As used herein, symbol $\otimes$ represents image convolution with a two-dimensional Gaussian kernel K. An image normalized in such a way is invariant to some brightness transformations. Thus, if the input image has elements with constant brightness gradient, then these elements will have value Lc(x, y)=1 upon normalization.

Normalization 308 based on calculation of the local contrast may be more efficient than normalization by brightness if:

the lighting is not frontal (e.g., the source of lighting is not located in front of the face, but, for example, on a side); or the image has a limited dynamic brightness range (e.g., in insufficient or evening lighting).

For image recognition, a normalized facial image may be compared with normalized reference images kept in the reference image database 220 to calculate 310 distances between the reference images and the normalized facial image. In general, reference facial images may correspond to different orientations of a face. Accordingly, image normalization of such faces may require multiple facial feature references (e.g., eye pupil centers, nose, ears, mouth, nose and so forth). Reference images for use in such comparisons may be obtained by processing previous input images.

In some embodiments, the comparison and distance calculation 310 process for image recognition using motion fields comprises several stages. For example, the comparison process may consist of two or more stages that may include fast distance calculations and precise distance calculations. Fast distance calculations are used to quickly determine if an input facial image can be recognized or rejected with a high degree of certainty while precise distance calculations are used to more definitively identify a facial image. For example, the following methods may be used for distance calculations:

DCT-based distance calculations between normalized input facial images to normalized reference images in the database; and motion-field-based image alignments for fine comparison.

In an example embodiment, DCT-distances may be calculated in the following way. Input and reference images may be split into pixel blocks (e.g., 8×8 pixel blocks). Each of these blocks may be described by a set of features obtained from the DCT of the block. Each block that has vertical and horizontal neighboring blocks may be described through the following steps:

1. calculate the table (e.g., 8×8) of DCT coefficients of a block;
2. extract a number of informative DCT coefficients (e.g., the first 5, 10 or 15) depending on the desired level of accuracy; and
3. replace the first DCT coefficients (e.g., first three) of each block with values representing the weighted differences of corresponding coefficients in neighboring (e.g., horizontal and vertical) blocks.

As a result, a value representing the number of feature values for a block is obtained. For example, if the number of extracted most informative DCT coefficients is 15 and the number of replaced first DCT coefficients is 3, then the number of feature values for the block is 18. In an example embodiment, the distance of an input facial image to a reference image is a weighted sum of the distances between the input facial image blocks and the reference image blocks.

If a distance calculated 310 is greater than predetermined threshold $\theta_1$ 312, then comparison module 208 may return a negative recognition result 318, indicating that the input facial image and the reference image are not of the same person. Otherwise, comparison module 208 compares the distance with threshold $\theta_2$. If the distance is less than $\theta_2$, comparison module 208 may return a positive recognition result 316, indicating that the input facial image and the reference image are of the same person. Otherwise, the process of motion-aligned distance calculation is invoked 500 to perform a more detailed comparison.

For example, if compared facial images have a distance greater than threshold $\theta_1$, they are considered to be dissimilar (e.g., they are not of the same face and/or have a dissimilar orientation of the face). If compared images have a distance less than threshold $\theta_2$, the unknown image is considered to be recognized. However, further comparisons and/or processing (if desired), such as the motion aligned distance calculations 500, may subvert this decision. If compared images have a distance greater than threshold $\theta_2$ and less than threshold $\theta_1$, further processing/comparisons using motion aligned distance calculations 500 are performed to determine whether the distance falls within threshold $\theta_2$ (e.g., the images are similar enough for recognition).

After a motion-aligned distance is calculated, it is compared with threshold $\theta_3$ 320. If the distance is greater than threshold $\theta_3$, the returned distance may be rejected 318 as a possible recognition. If the distance is less than threshold $\theta_3$, the returned distance may be considered as a recognition 316.

Motion Field Calculations

Figure 4A:
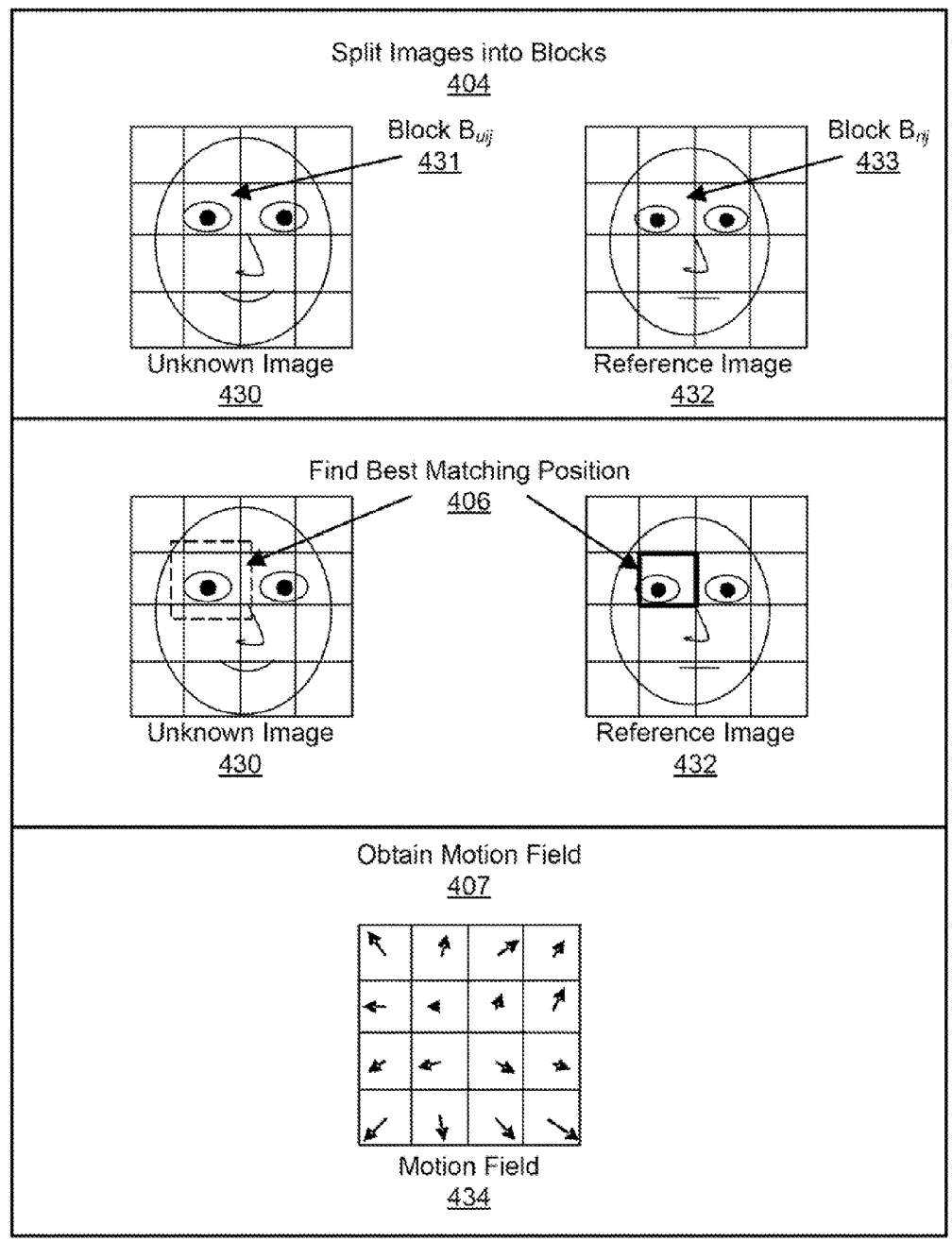
FIG. 4A is a diagram illustrating an example motion field distance calculation, in accordance with an example embodiment.

Turning now to FIG. 4A, a diagram illustrates an example motion field distance calculation, in accordance with an embodiment. The motion field is a set of vectors representing ideal shifts in regions of an unknown image to align with a reference image and allow for an accurate comparison between the two images.

The distance evaluation begins with a center point alignment of two images. As mentioned previously, center point alignment involves overlaying the images on top of each other such that they meet at their centers. These centers may be determined by various factors, which may include, physical image centers, facial features, a region defined during the normalization process and so forth. Once the images are aligned using their center points, a motion field may be established to further align the images for distance calculations. In one embodiment, the unknown facial image 430 and reference image 432 are split 404 into blocks. As described previously, corresponding blocks are compared to determine a displacement (e.g., $\Delta x$, $\Delta y$ in an x-y plane) that provides the best match between the compared blocks.

For example, FIG. 4A illustrates a comparison between corresponding blocks 431, 433. Unknown image 430 illustrates a right eye having a pupil center at position P1. Reference image 432 similarly illustrates a right eye, but its pupil center is at position P2. The motion field module 210 serves to determine a motion vector that best aligns the pupil center at P1 from the unknown image 430 with the pupil center at P2 of the reference image 432. Similarly, identified features within other blocks may be compared to determine motion vectors. For example, the pixels representing an outline of facial features, including a face, eyes, nose, mouth, ears, and the like, may be used to determine a motion vector for matching the features of corresponding blocks. The motion field for the unknown image 430 and the reference image 432 is generated by determining a motion vector describing a displacement (e.g., $\Delta x$, $\Delta y$) and a minimum difference producing a best match between each corresponding pairs of blocks. As described previously, the motion field 434 describes the changes in the unknown images 430 (e.g., at a block level) that best change the displacement of blocks in the unknown image 430 to match those in the reference image 432.

In some embodiments, the changes determined from neighboring blocks are averaged together and used to interpolate motion vectors at any given point (e.g., on a per pixel basis) in the unknown image (e.g., weighted based on the distance to nearby motion vectors).

Figure 4B:
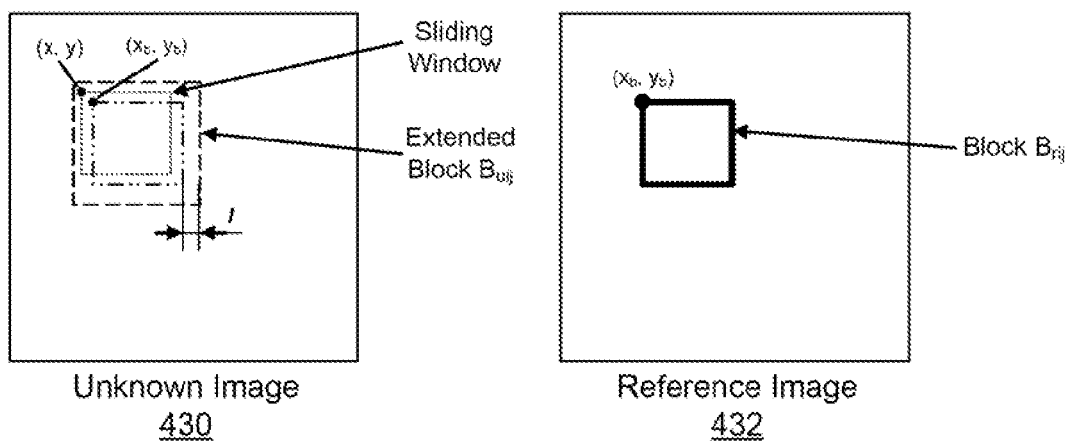
FIG. 4B is a diagram illustrating an example calculation of motion field vector parameters, in accordance with an example embodiment.

FIG. 4B is a diagram illustrating an example calculation of motion vector parameters, in accordance with an embodiment. In one embodiment, minimum distance calculation between block $B_{ij}$ of $I_u'$ and extended block $B_{ij}$ of $I_r'$ of may be determined from DCT calculations. A sliding window (block $B_{ij}$ of $I_u'$) is used over extended $B_{ij}$ with left top corner coordinate $(x_b, y_b)$ of $I_r'$ and a matching coefficient $c_m$ at point (x, y) evaluate at each point, as defined by equation (7):

$$c_m(x, y) = \sum_{i=0}^{m-1} \sum_{j=0}^{n-1} |I_r'(i + x_b, j + y_b) - I_u'(i + x, j + y)|,$$

where $x_b - l \leq x \leq x_b + l$, $y_b - l \leq y \leq y_b + l$, l is an extension parameter, m is the height of slicing window, and n the width of sliding window.

Figure 4C:
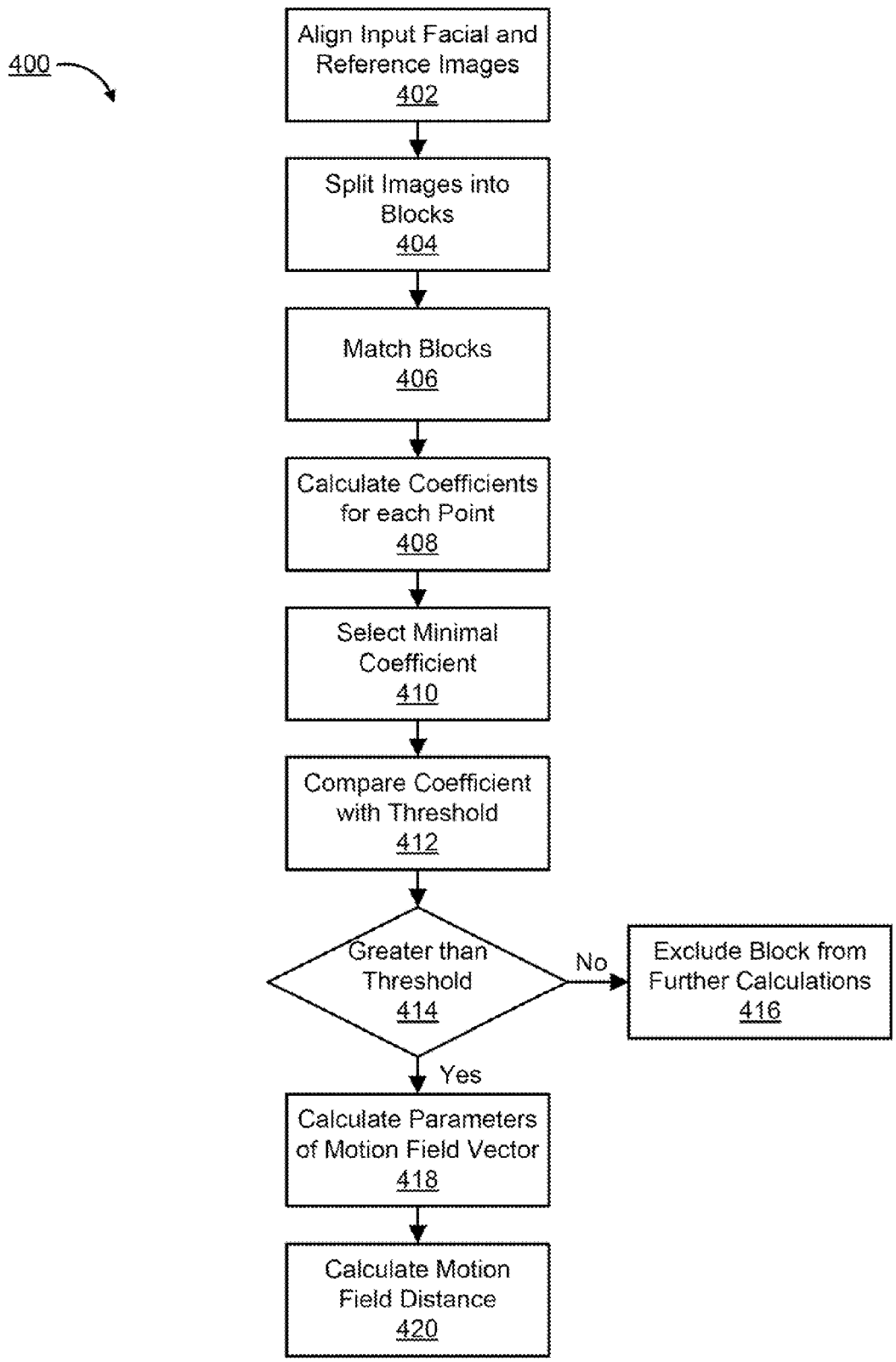
FIG. 4C is a flow chart illustrating a method for calculating a motion field distance, in accordance with an example embodiment.

FIG. 4C is a flow chart illustrating a method for calculating motion field distance, in accordance with an example embodiment. As illustrated in the examples presented in FIGS. 4A and 4B, input facial images and reference images are aligned 402, split 404 into blocks and, in turn, the blocks are matched 406. A coefficient for each coordinate on the images is then calculated 408 using equation (9). Each coefficient represents the degree to which the corresponding blocks are aligned. The minimal value coefficient is selected 410 and compared 412 to a predetermined threshold. If the minimal value coefficient surpasses the predetermined threshold, then it may be defined as the best matching coefficient value. Its associated motion field vector may then be used during further calculations and image processing. If the coefficient does not pass the threshold value, it may be excluded 416 from further consideration. This process may be iterated several times through the list of coefficients in order to determine the best matching coefficient value. The motion field corresponding to the best coefficient value represents an ideal shift for each block in an image to align with a reference image.

Thus, if the best matching coefficient is found at point $(x_{best}, y_{best})$, then the offsets are calculated 418 by equations (8) and (9):

$$\Delta x = x_{best} - x_b,\quad \text{(Eq. 8)}$$

$$\Delta y = y_{best} - y_b.\quad \text{(Eq. 9)}$$

After a motion field is calculated, an average motion field distance can be calculated 420 using the average sum over all the best matching coefficients (e.g., motion vectors).

Motion Aligned Distance Calculation

Figure 5:
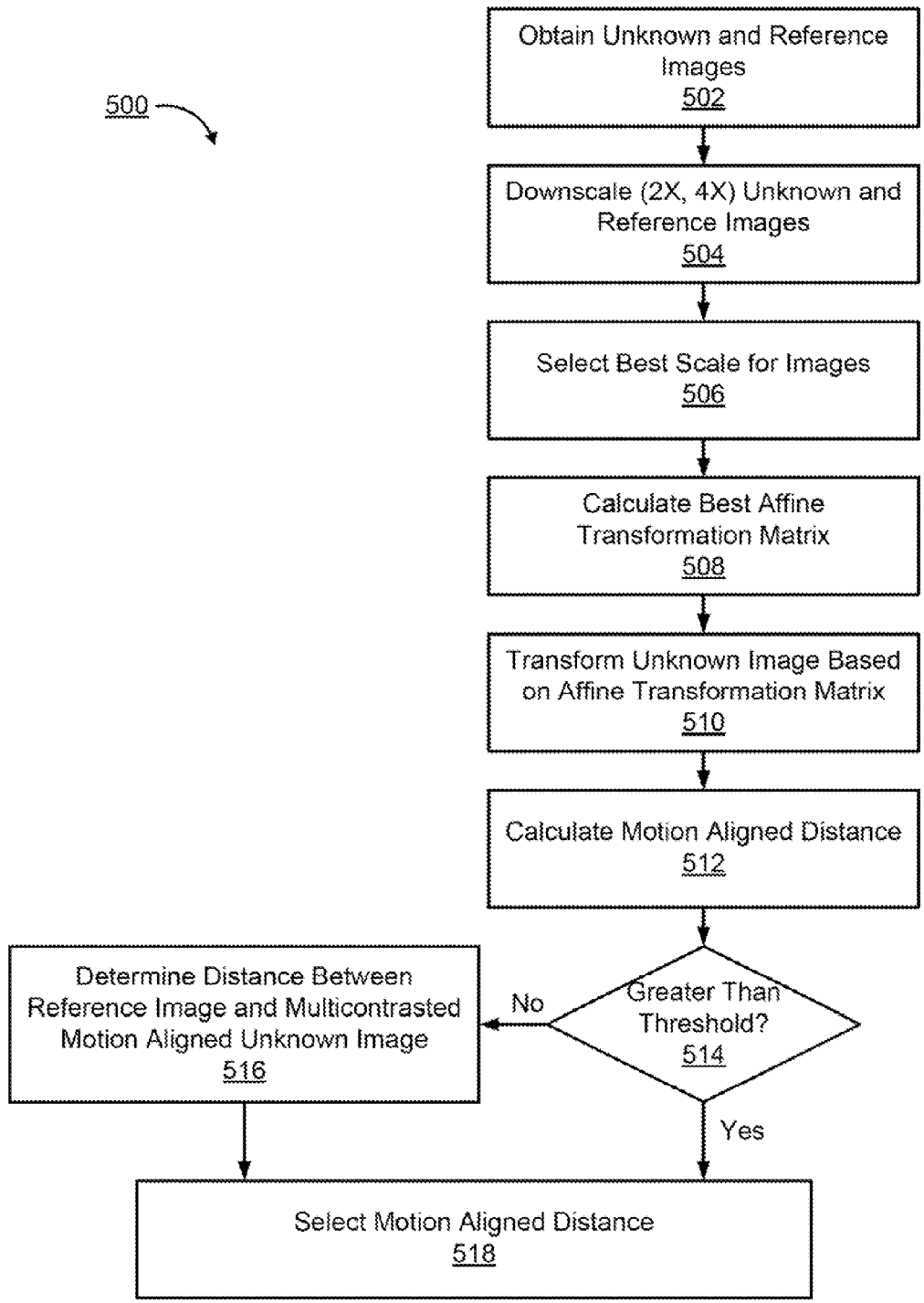
FIG. 5 is a flow chart illustrating a method for calculating a motion aligned distance, in accordance with an example embodiment.

If faster distance calculations 310 are unable to accurately determine an input facial image identity, image processor 200 may proceed to a more precise calculation called motion aligned distance calculations. FIG. 5 is a flow chart illustrating a method for a motion aligned distance, in accordance with an example embodiment. Each of the listed steps may be performed by one or more of the modules of image processor 200, illustrated previously in FIG. 2.

After obtaining 502 an unknown image (input facial image), the unknown image may be downscaled 504. Downscaling, ideally, reduces the quality of each image while allowing comparisons between sets of images to be performed much more quickly due to unimportant visual data being discarded. Accordingly, downscaling may be performed to a degree that eliminates data unnecessary for comparison and recognition purposes but retains data advantageous to recognition. This may be performed through various processes, which may include resizing an image or utilizing image compression algorithms that reduce the size and quality of the image.

One example downscaling algorithm that may be used in one or more embodiments is employing downscaling with a rectangular window. That is using a downscale having a factor which is a multiple of two. A downscaled pixel value may be calculated as an average of four corresponding pixels in a larger scale. Larger downscales may be accomplished via recursive execution of the same algorithms, thus applying downscale factors of 4, 8, etc. The described algorithm is computationally efficient and simple; whereas other more complex algorithms perform slower.

Because more prominent facial features, such as eye and ear position, mouth and nose shapes, facial outline, skin color and so on, are more important aspects for comparison than minor features, such as small skin blemishes or wrinkles, downscaling becomes a worthwhile trade-off between computation loads and image quality. Thus, more downscaled images (e.g., 4x) may allow for faster comparisons but are not as accurate as comparisons done with less downscaled images (e.g., 2x). However, various degrees of downscaling may be used for motion field generation, distance calculations, and image comparisons to generate different quality images. Less downscaled images produce higher quality images, but may increase the computational load for processes run using these images. More downscaled images produce lower quality images, but may decrease the computational load for processes run using these images.

Faces present in unknown facial images may be of a different size compared to faces in reference images. By rescaling unknown facial images, comparisons may be done more accurately between the unknown images and reference images. A set of differently scaled images may be created from the downscaled unknown image to determine the best resize scale for an unknown image. The face from the resized images that best matches the face in downscaled reference images is identified and the resizing scale is stored. This resizing scale is selected 506 as the best scale. This best scaling factor may be used to resize the downscaled unknown image for later steps of the motion aligned distance calculations.

To further prepare an unknown image for precise comparisons with reference images, affine transformation module 216 may generate various matrices using the best scale factor and use other attributes of downscaled unknown images to calculate 508 a best affine transformation matrix. As mentioned previously, each unknown image contains a number of points representing coordinates on the image. By shifting these points, facial features in the image can be modified to make the image better suited for comparing to reference images. An affine transformation matrix is the mathematical component that may be applied to an unknown image to create a transformed image that can be accurately compared with reference images. After the affine transformation matrix is applied to and transforms 510 the unknown image, a motion aligned distance may be calculated 512.

The normalization processes performed initially may compensate for some differences in sizing, brightness, contrast, and significant misalignments. However, image comparisons between an unknown image and reference images may be ineffective without further tuning and modification of an unknown image. To accurately compare an unknown image with a reference image, both images should be closely aligned as possible. This may involve overlaying the two images on top of each other and producing a motion field to reflect the necessary shifts in coordinate points to align the two images. An affine transformation matrix can be generated from a motion field and best scale factor. When applied to an unknown image, the affine transformation matrix shifts points and features on an image so that the image is better aligned with a reference image, facilitating comparison between the two images.

If the motion aligned distance is greater than a certain threshold 514, then it is selected 518 as the final motion aligned distance for the image. However, in a scenario involving multi-contrasted motion aligned unknown images, further calculations may be necessary to determine 516 the distance between those unknown images and reference images. Upon completion of these calculations, image processor 200 selects 518 a representative motion aligned distance to be used for determining whether an unknown facial image is recognized or rejected.

Scale Factor Calculations

Figure 6A:
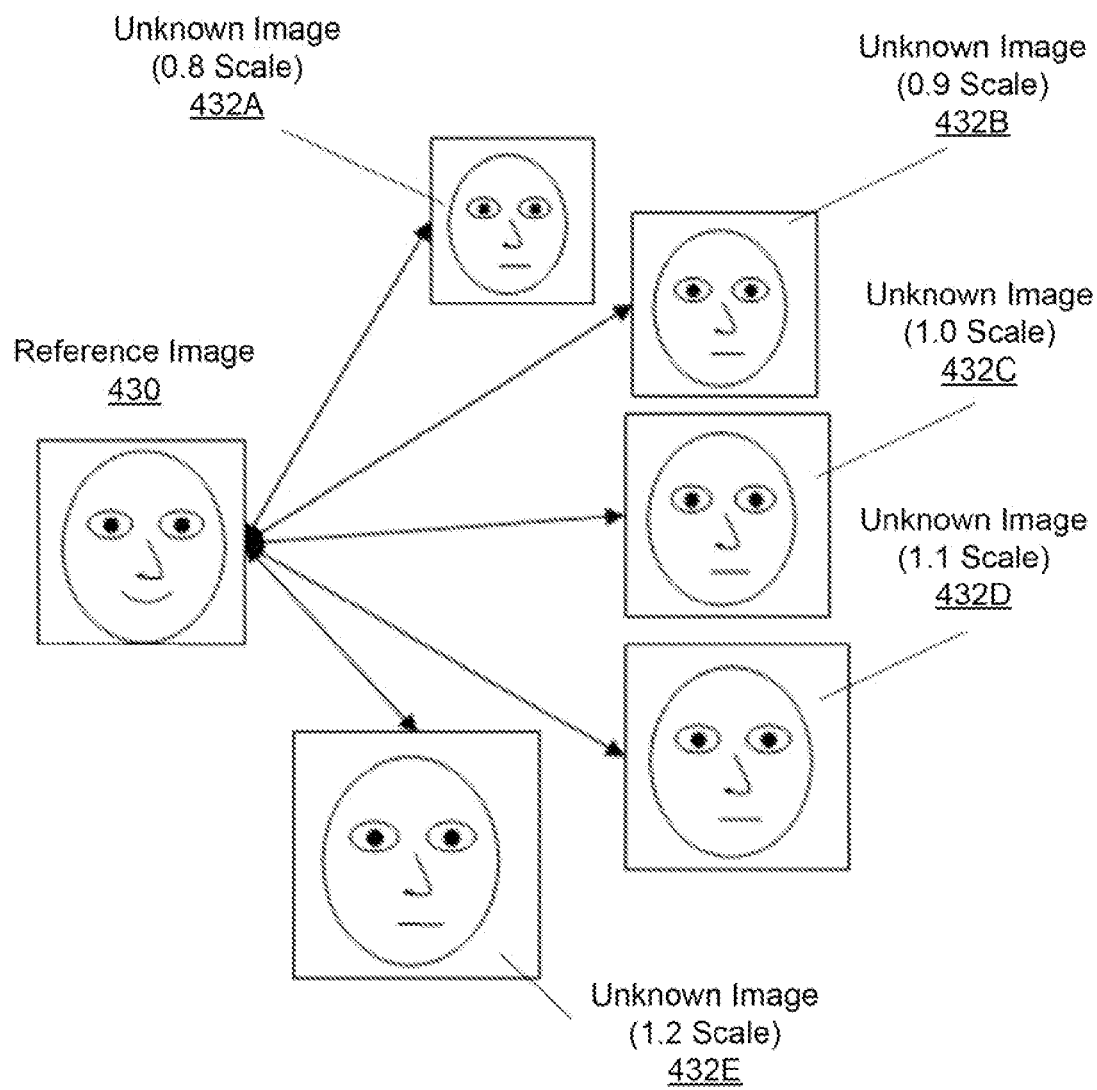
FIG. 6A is a conceptual diagram illustrating image matching using a scale set, in accordance with an example embodiment.

Referring now to FIG. 6A, illustrated is a conceptual diagram of an image matching using a scale set, in accordance with an example embodiment. In some embodiments, aligned unknown image and reference image resizing improves precision of distance calculations. A set of scaled images are generated from a downscaled unknown image 432. Parameters may be predetermined for the starting and ending scale parameters, as well as for the intermediary scale intervals (e.g., 0.8x to 1.2x in intervals of 0.1x). In the example illustrated in FIG. 6A, unknown image 432 is scaled to generate a 0.8 scaled image 432A, 0.9 scaled image 432B, 1.0 scaled image 432C, 1.1 scaled image 432D, and 1.2 scaled image 432E. In other embodiments, a wider range of scales or smaller increments of scales may be used to generate the scaled images. A downscaled reference image 430 may be compared to each of these scaled images in order to determine the scaled image face that best matches the size of the reference face.

Initially, a face or group of facial features in an unknown image may not be the same size as those in a reference image. In part due to the mismatch in size, an unknown image may not be accurately compared to reference images. Without resizing either image, an image processor may fail to identify (or incorrectly identify) the unknown image because the image is incorrectly related to a given reference images. Through resizing, the images may be overlaid on top of each other and may also be compared on a similar basis. Determining an accurate resizing factor and applying it allows later processes to further fine-tune modifications for aligning an unknown image and reference image for comparison purposes.

Figure 6B:
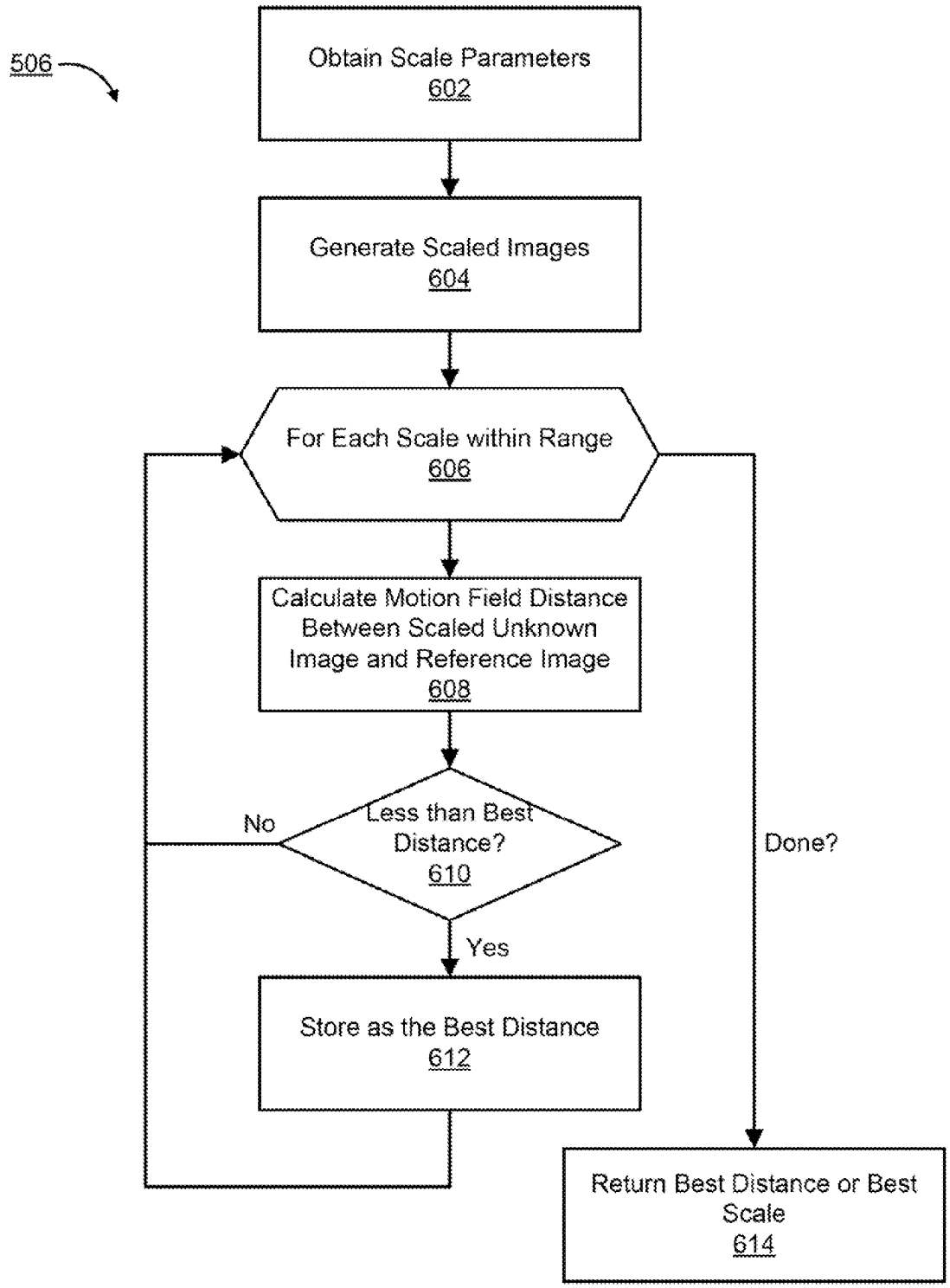
FIG. 6B is a flow chart illustrating a method for calculating distances between a scaled image set and a reference image, in accordance with an example embodiment.

FIG. 6B is a flow chart illustrating a method for calculating distances between a scaled image set and a reference image, in accordance with an embodiment. After obtaining scale parameters 602, scale module 214 may generate 604 a set of scaled images from the downscaled unknown image. For incoming reference and unknown images, the best scale is defined. Inside the loop, distances between scaled images and a downscaled reference image are calculated 608 to determine the scaled image having the minimum distance to the downscaled reference image (e.g., has the best motion field alignment or smallest DCT difference). The smallest distance is determined 610 and stored 612 as the distances are calculated. In some embodiments, the scale is refined using looped calculations with decreasing step value. The scale having the minimum distance, or "scale best," is returned 614 for a motion aligned field calculation. As mentioned herein, in some embodiments, a motion aligned distance and/or other distance may be stored 612 and returned 614 with the best scaled value. In addition, in some embodiments, the downscaled unknown image and the downscaled reference image may be swapped and process for determining a best scale factor illustrated in FIG. 6B is repeated. However, in this scenario, the downscaled reference image is resized and the downscaled unknown image maintains the same size. The set of resized reference images are compared to the unknown image.

Affine Transformation Matrix Calculations

Figure 7A:
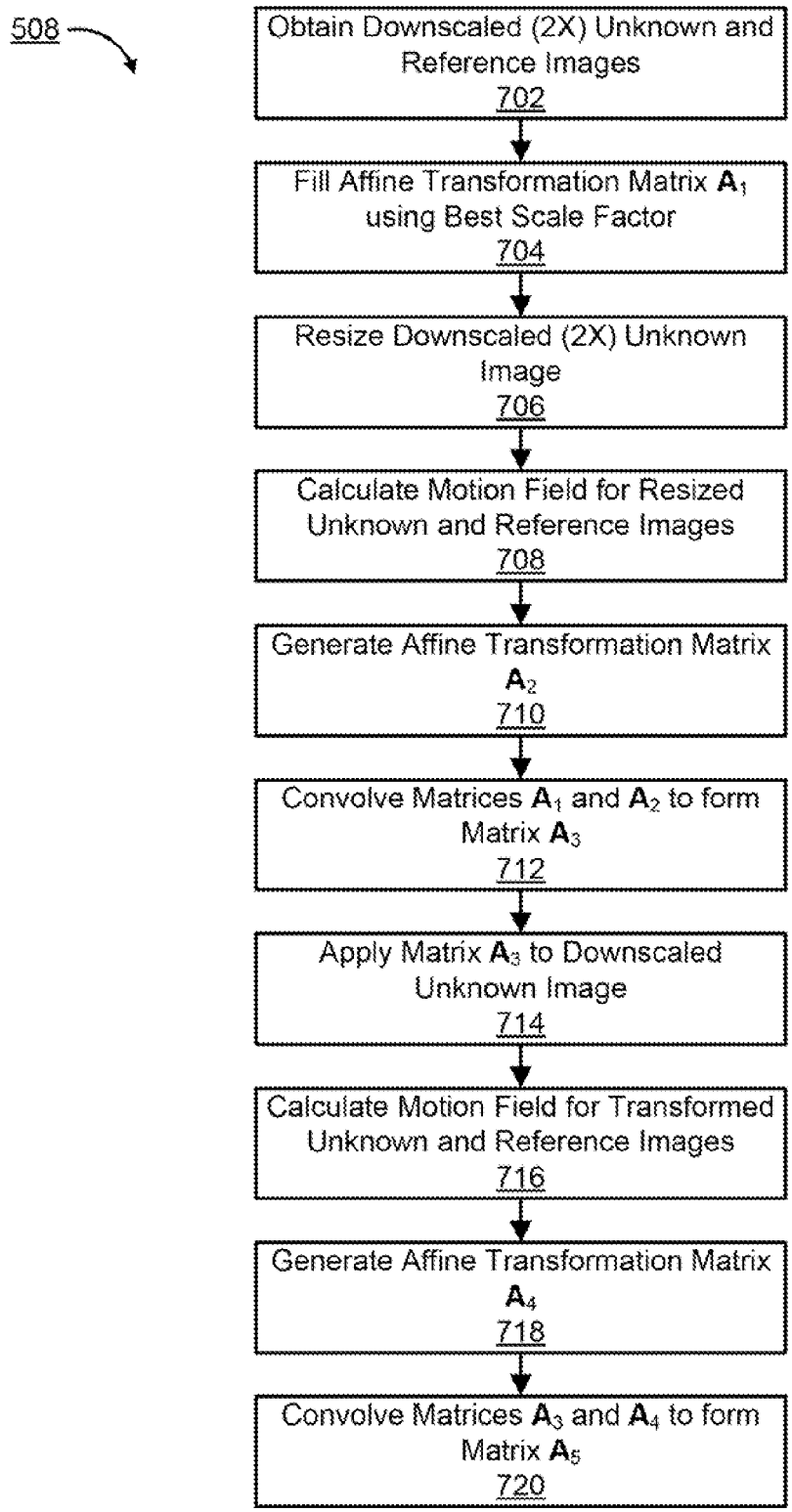
FIG. 7A is a conceptual diagram illustrating a motion vector parameters calculation, in accordance with an example embodiment.

FIG. 7A is a conceptual diagram illustrating a motion vector parameters calculation, in accordance with an embodiment. In an embodiment, the image processor 200 generates a set of downscaled images from unknown input and reference images inputted 702. Using embodiments of methods described above, a best scale factor may be calculated by scale module 214 for resizing the unknown image to better align with the reference image. The determined best scale value can then be utilized by an affine transformation module 216 to fill 704 affine transformation matrix $A_1$. The downscaled unknown image is then resized 706 according to the scale factor for processing. In some embodiments, the motion field may then be recalculated 708 by motion field module 210 using the downscaled reference image and the resized unknown image. The motion field is used as the recommendation for estimating the change in an image, such as for the downscaled unknown image and the resized unknown image.

The image changing or transformation can be described by a matrix of affine transformation and is performed by an affine transformation module 216. In some instances, the motion field does not include all displacements ($\Delta x_i$, $\Delta y_i$), thus an algorithm to find the best affine transformation that minimizes differences of displacements is used.

In some embodiments, the affine transformation module 216 generates 710 an affine transformation matrix ($A_2$) from motion field. In some embodiments where the motion field recommends how to modify the resized unknown image for best matching, the image may be considered as a rigid structure and transformation for all points is the same. One embodiment of the rigid structure transformation denotes an affine transformation using equation (10):

$$[x'_i \quad y'_i \quad 1] = [x_i \quad y_i \quad 1] \begin{bmatrix} a & d & 0 \\ b & e & 0 \\ c & f & 1 \end{bmatrix},$$

where $x'_i$, $y'_i$ are coordinates of the transformed image, $x_i$, $y_i$, are coordinates of the original image, and a, b, c, d, e and f are parameters of affine transformation.

The process of transformation can be depicted equations (11) and (12):

$$x_i' = ax_i + by_i + c, \ i = \overline{1,n}; \tag{Eq. 11}$$

$$y_i' = dx_i + ey_i + f, \ i = \overline{1,n}. \tag{Eq. 12}$$

As $\Delta'x_i = x_i' - x_i$ and $\Delta'y_i = y_i' - y_i$, the previous expression may be modified to become equations (13) and (14):

$$\Delta x_i' = ax_i - x_i + by_i + c, \ i = \overline{1,n}; \tag{Eq. 13}$$

$$\Delta y_i' = dx_i + ey_i - y_i + f, \ i = \overline{1,n}, \tag{Eq. 14}$$

then, simplifying into a compact form, equations (13) and (14) become:

$$\Delta x_i' = (a-1)x_i + by_i + c, \ i = \overline{1,n}; \tag{Eq. 13}$$

$$\Delta y_i' = dx_i + (e-1)y_i + f, \ i = \overline{1,n}. \tag{Eq. 14}$$

Figure 7B:
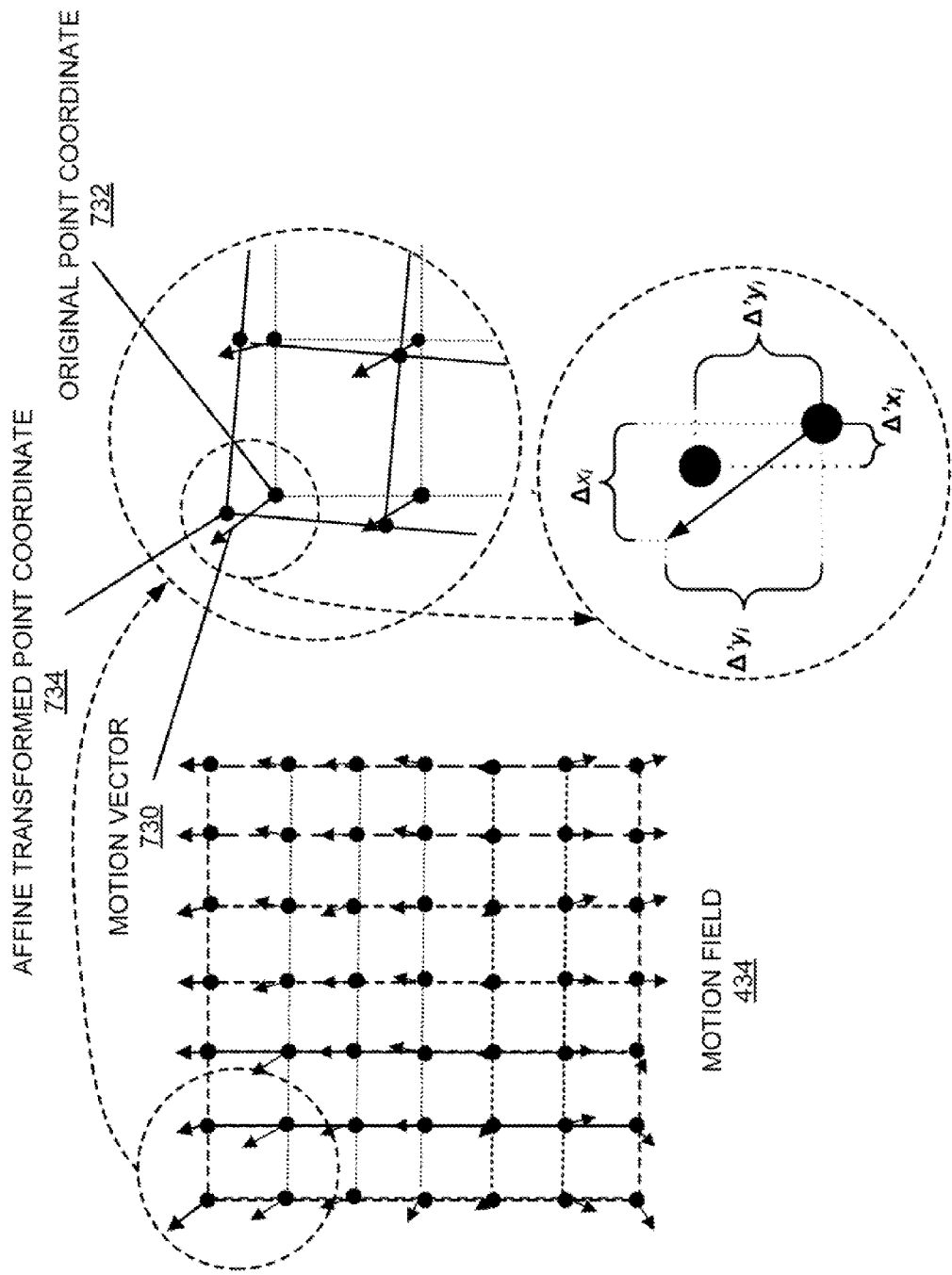
FIG. 7B is a flow chart illustrating a method for calculating affine transformations using motion field calculations for a specified scale level, in accordance with an embodiment.

FIG. 7B is a flow chart illustrating a method for calculating affine transformations using motion field calculations for a specified scale level, in accordance with an embodiment. From a motion field 434, motion field module 210 determines a motion vector 730 for each point. An affine transformation matrix calculated by affine transformation module 216 shifts an original point coordinate 732 to an affine transformed point coordinate 734, as is shown in an embodiment in FIG. 7B. In ideal cases where $\Delta'x_i = x_i'$ and $\Delta'y_i = y_i'$, an optimization task can be performed to ensure equality and minimize differences. In one embodiment, these ideal cases are linear regressions which can be solved by a linear least squares approach. By defining the i-th residual to be equation (15):

$$r_i = \Delta x_i - \Delta x_i' = \Delta x_i - (a-1)x_i + by_i + c,$$

S can be rewritten as equation (16):

$$S = \Sigma_{i=1}^{n} r_i^2,$$

where S is minimized when its gradient vector is zero. The elements of the gradient vector are the partial derivatives of S with respect to the parameters a, b, c, d, e and f.

For example, the normal equations are written in matrix notation as shown in equation (17):

$$\begin{cases} [C^T C] \begin{bmatrix} \hat{a} \\ b \\ c \end{bmatrix} = C^T \Delta X \\ [C^T C] \begin{bmatrix} d \\ \hat{e} \\ f \end{bmatrix} = C^T \Delta Y \end{cases} \rightarrow \begin{cases} A \begin{bmatrix} \hat{a} \\ b \\ c \end{bmatrix} = \overline{f} \\ A \begin{bmatrix} d \\ \hat{e} \\ f \end{bmatrix} = \overline{\overline{f}} \end{cases}$$

when components C and $C^T C$ are solved for, equations (18) and (19) result:

$$C = \begin{bmatrix} x_1 & y_1 & 1 \\ x_2 & y_2 & 1 \\ \ldots \\ x_n & y_n & 1 \end{bmatrix},$$ (Eq. 18)

$\hat{a} = a - 1,$ $\hat{e} = e - 1,$ $$\Delta X = \begin{bmatrix} \Delta x'_1 \\ \Delta x'_2 \\ \ldots \\ \Delta x'_n \end{bmatrix},$$

$$\Delta Y = \begin{bmatrix} \Delta y'_1 \\ \Delta y'_2 \\ \ldots \\ \Delta y'_n \end{bmatrix},$$

$$A = C^T C = \begin{bmatrix} \sum x_i^2 & \sum x_i y_i & \sum x_i \\ \sum x_i y_i & \sum y_i^2 & \sum y_i \\ \sum x_i & \sum y_i & n \end{bmatrix},$$ (Eq. 19)

$\overline{f} = C^T \Delta X,$ $\overline{\overline{f}} = C^T \Delta Y.$

Thus, in the example embodiment, affine transformation module 216 solves the systems of linear algebraic equations. In one approach, Cholesky's method can be used.

In the illustrated embodiment, considering the matrix A of linear systems to be symmetric (e.g., $a_{ij} = a_{ji}$), positive matrix. The matrix can be represented as $A = LL^T$, where L and $L^T$ are represented by equations (20 and 21)

$$L^T = \begin{bmatrix} l_{11} & l_{12} & l_{13} \\ 0 & l_{22} & l_{23} \\ 0 & 0 & l_{33} \end{bmatrix},$$ (Eq. 20)

$$L = \begin{bmatrix} l_{11} & 0 & 0 \\ l_{12} & l_{22} & 0 \\ l_{13} & l_{23} & l_{33} \end{bmatrix}.$$ (Eq. 21)

Further, as in the case of LU-decomposition, the solution of linear algebraic equations $$A \begin{bmatrix} \hat{a} \\ b \\ c \end{bmatrix} = \overline{f}$$

is reduced to the solution of two linear systems with triangular matrices $Lv = \overline{f}$, $$L^T \begin{bmatrix} \hat{a} \\ b \\ c \end{bmatrix} = \overline{f},$$

the solution of which requires approximately $2n^2$ arithmetic operations.

The first of these linear systems has equation (22) for solving:

$$v_1 = \frac{\overline{f}_1}{l_{11}},$$ (Eq. 22)

$$v_2 = \frac{\overline{f}_2 - l_{21} v_1}{l_{22}},$$

$$v_3 = \frac{\overline{f}_3 - (l_{13} v_1 + l_{23} v_2)}{l_{33}}.$$

The second one linear system determines the roots calculated by equation (23):

$$c = \frac{v_3}{l_{33}},$$ (Eq. 23)

$$b = \frac{v_2 - l_{23} c}{l_{22}},$$

$$\hat{a} = \frac{v_1 - (l_{12} b + l_{13} c)}{l_{11}}.$$

Elements of the matrix L is found from the equation $LL^T = A$, equating the corresponding elements of the matrices $LL^T$ and A, such as shown by equations (24, 25, and 26):

$$l_{11} = \sqrt{a_{11}};$$ (Eq. 24)

$$l_{12} = \frac{a_{12}}{l_{11}};$$

$$l_{13} = \frac{a_{13}}{l_{11}};$$

$$l_{22} = \sqrt{a_{22} - l_{12}^2};$$ (Eq. 25)

$$l_{23} = \frac{a_{23} - l_{12} l_{13}}{l_{22}};$$

$$l_{33} = \sqrt{a_{33} - l_{13}^2 l_{23}^2}.$$ (Eq. 26)

Embodiments of the above method may also be used to find parameters d, e and f.

Referring back to FIG. 7A, when affine transformation matrix $A_2$ is calculated, there are two transformations, $A_1$ and $A_2$ (i.e., transformation of transformation). These may be convolved into $A_3$ by matrix multiplication 712. By applying the affine transformation $A_3$ to the downscaled unknown image 714, a new motion field may be calculated for a transformed unknown image and downscaled reference image 716. In some embodiments, the motion field may be used to generate 718 affine transformation matrix $A_4$. Furthermore, the embodiment may include a final affine transformation $A_5$ resulting from convolution 720 of $A_3$ and $A_4$.

Final Motion Aligned Distance Comparison Calculations

Figure 8:
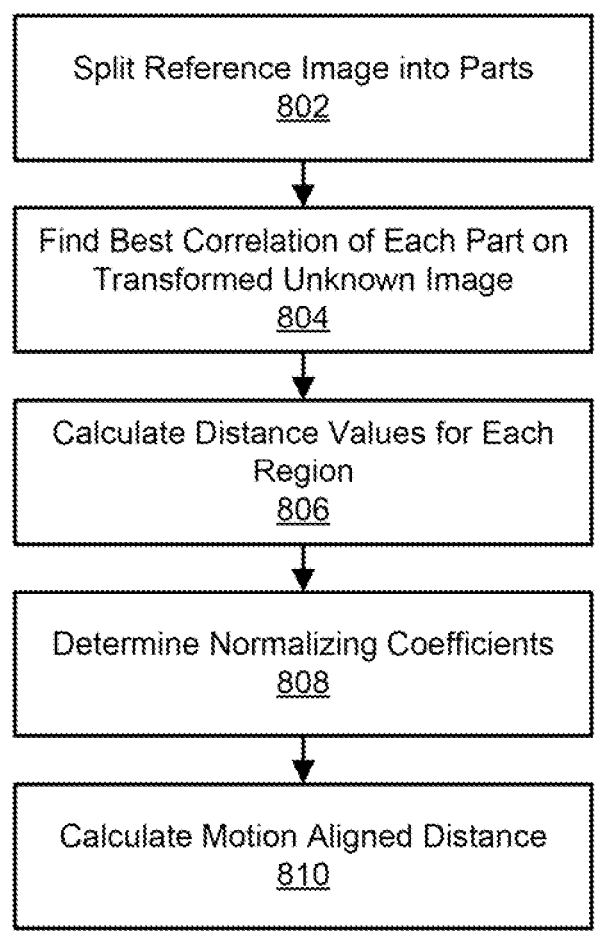
FIG. 8 is a flow chart illustrating a method for determining a motion aligned distance between a reference image and an unknown transformed image, in accordance with an example embodiment.

Once a transformation (e.g., $A_5$, etc.) is applied to the original (non-downscaled and non-resized) unknown image, the original reference image and transformed unknown image may be further normalized by normalization module 204 and compared using distances calculated by distance calculator module 206. FIG. 8 is a flow chart illustrating a method for determining motion aligned distance between a reference image and unknown transformed images, in accordance with an embodiment. The original reference image is split 802 into different parts. In an embodiment, these parts may include the eyes, nose and mouth. For each region of the original reference image, the best correlation matching the region within extended regions of the original unknown image is determined 804.

In some embodiments, the influence of illumination properties of compared images is mitigated using one or more normalization procedures. In one example, for both the original unknown and reference images, the average pixel value $M(I)$ and standard deviation value $\sigma(I)$ are calculated by equations (27, 28, and 29):

$$M(I) = \frac{1}{m \cdot n} \sum_{i=1}^{m-1} \sum_{j=1}^{n-1} I(i, j), \quad \text{(Eq. 27)}$$

$$\sigma(I) = \left[ \frac{1}{m \cdot n} \sum_{i=1}^{m-1} \sum_{j=1}^{n-1} (I(i, j) - M(I))^2 \right]^{1/2}, \quad \text{(Eq. 28)}$$

where m and n are the width and height of the image I. A normalized image $I_{norm}$ may then be found using the average pixel value and standard deviation in equation (29):

$$I_{norm}(i, j) = \frac{I(i, j) - M(I)}{\sigma(I)}.$$

Furthermore, after images are normalized, distance values may be calculated 806 for each region. For example, an L1-norm may be calculated for normalized etalon reference image $I_r^{norm}$ and normalized unknown image $I_u^{norm}$ in each region using equation (30):

$$d_{region} = \sum_i \sum_j |I_r^{norm}(i, j) - I_u^{norm}(i, j)|,$$

A normalizing coefficient $n_{region}$ may be determined 808 using equation (31):

$$n_{region} = \sum_i \sum_j I_r^{norm}(i, j) + I_u^{norm}(i, j).$$

The final formula for distance calculation can be denoted using equation (32):

$$d = \frac{d_{eyes} + d_{nose} + d_{mouth}}{n_{eyes} + n_{nose} + n_{mouth}}.$$

Using this formula, the motion aligned distance may be calculated 810 and returned to the image processor 200 for image recognition processing.

Multi-Contrasted Motion Aligned Image Calculations

Figure 9:
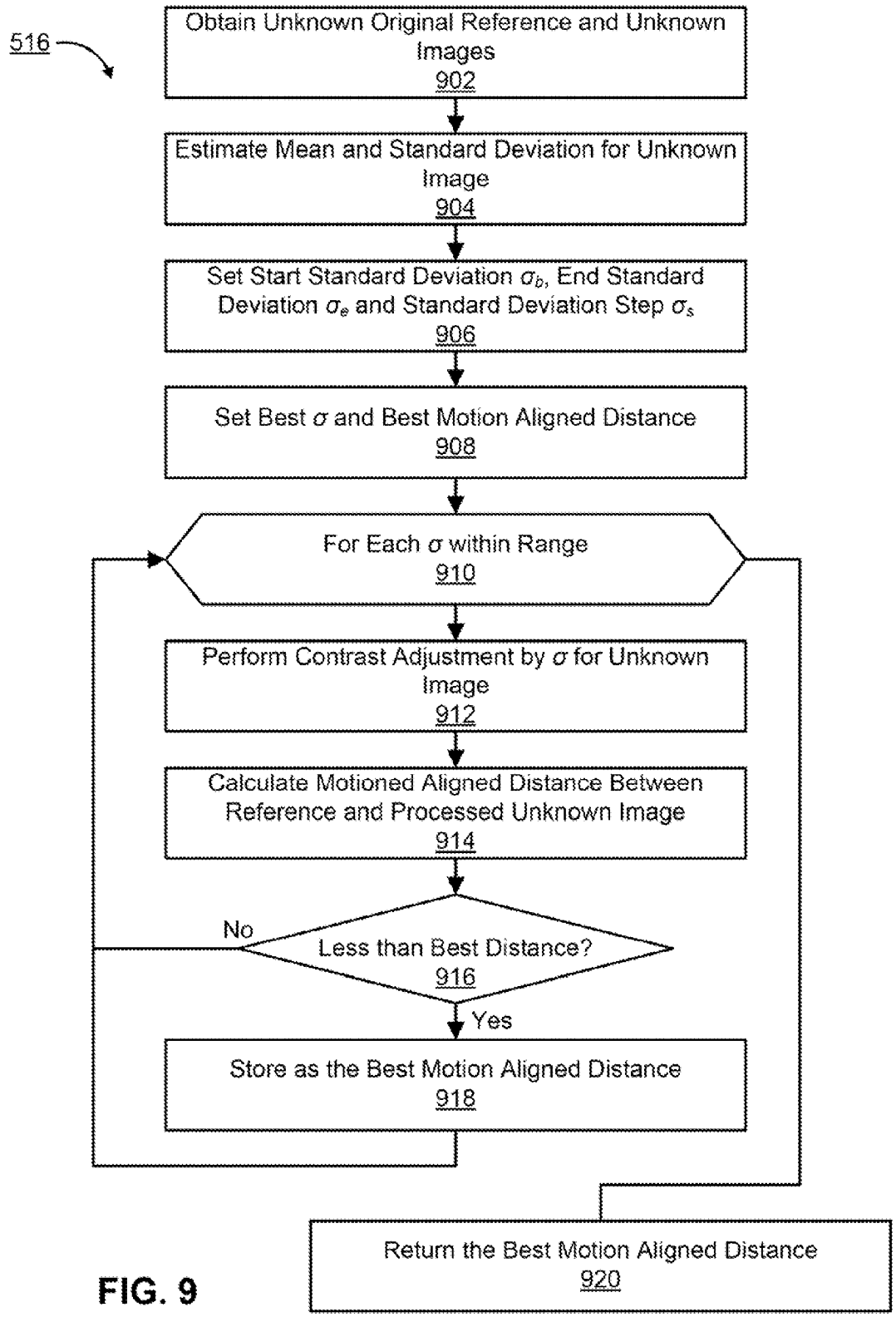
FIG. 9 is a flow chart illustrating a method for determining a motion aligned distance between a reference image and a multi-contrasted motion aligned unknown image, in accordance with an example embodiment.

FIG. 9 is a flow chart illustrating a method for determining a motion aligned distance between a reference image and a multi-contrasted motion aligned unknown image, in accordance with an embodiment. In some embodiments, the algorithm starts from estimating 904 the mean value $M(I_u)$ of pixels of unknown image and the standard deviation $\sigma(I_u)$. Then, in one embodiment, a range specified from $\sigma_b$ to $\sigma_e$ with step $\sigma_s$ is set 906. The best standard deviation and best motion aligned distance initialization is then set 908. In some embodiments, every standard deviation $\sigma_i$ is chosen 910 from the range to perform 912 contrast adjustments on the unknown image $I_u$, as shown in equation (33):

$$I_u^i = \sigma_i \frac{I_u - M(I_u)}{\sigma(I_u)} + a,$$

where $I_u^i$ is a processed (contrasted) unknown image, and a is a constant value.

Inside the loop, the obtained current unknown image is utilized to calculate 914 motion aligned distance. The evaluated distance is compared 916 with best distance and if condition is true, the current distance stored 918 the best motion aligned distance. The same calculation is performed using a different standard deviation until all standard deviations have been processed before the best motion aligned distance is returned 920 to the image processor 200 for image recognition usage.

Computing System Environment

Figure 10:
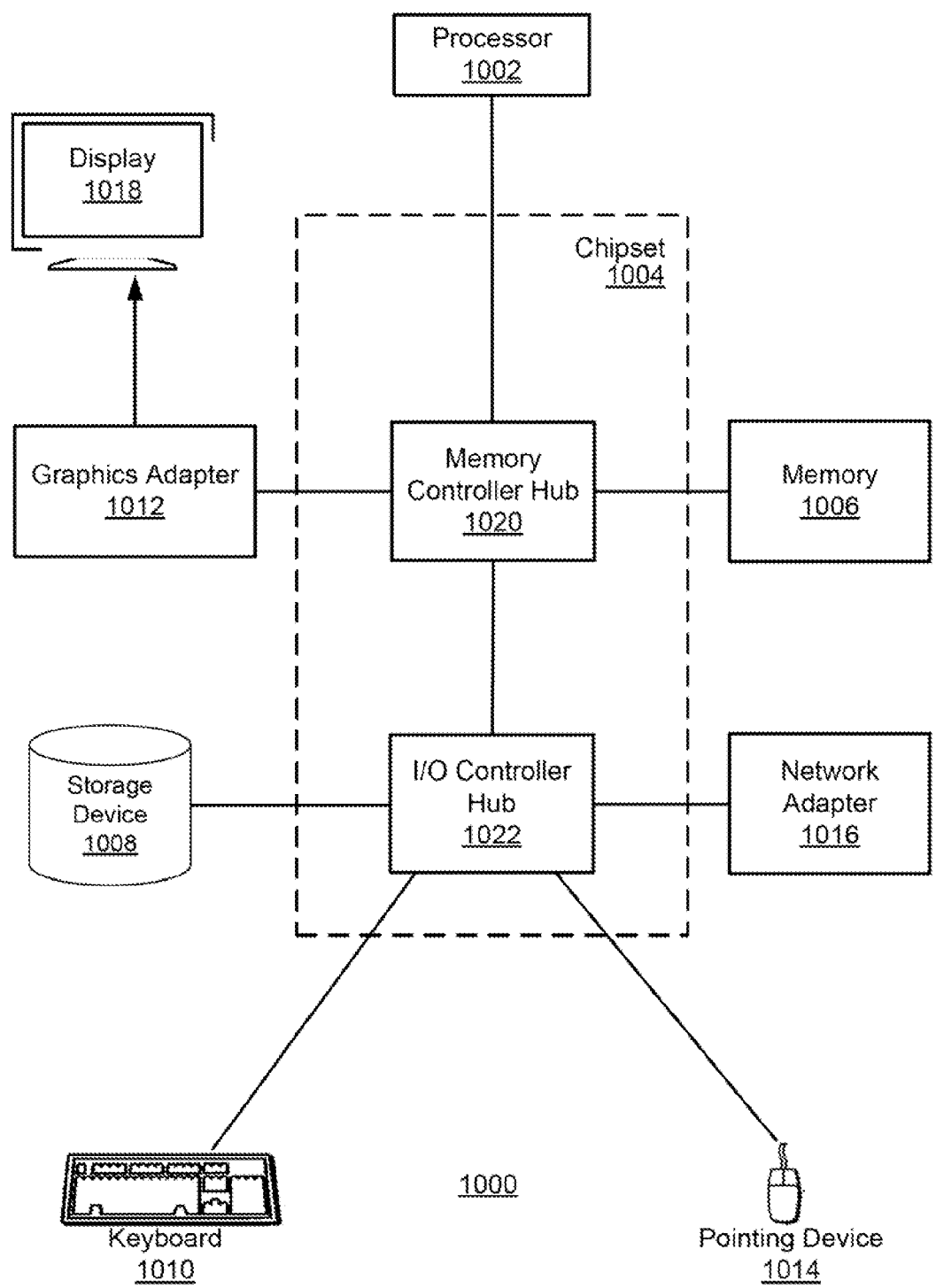
FIG. 10 is a system diagram illustrating a system for performing a motion aligned distance calculation, in accordance with an example embodiment.

FIG. 10 is a system diagram illustrating a system for performing a motion aligned distance calculation, in accordance with an embodiment. Illustrated are at least one processor 1002 (CPU) coupled to a chipset 1004. The chipset 1004 includes a memory controller hub 1020 and an input/output (I/O) controller hub 1022. A memory 1006 and a graphics adapter 1012 are coupled to the memory controller hub 1050, and a display device 1018 is coupled to the graphics adapter 1012. A storage device 1008, physical or virtual keyboard 1010, pointing device 1014, and network adapter 1016 are coupled to the I/O controller hub 1022. Other embodiments of the computing device 1000 have different architectures. For example, the memory 1006 is directly coupled to the processor 1002 in some embodiments; in other embodiments gesture inputs are used in place of pointing device 1014. Other embodiments of the computing device 1000 may have other modules, such as a camera, video recorder, external digital storage interfaces and so forth. Processes disclosed herein may execute in various embodiments of computing device 1000, including embodiments of computing device 1000 coupled with a cloud processing service. Furthermore, embodiments of computing device 1000 may include mobile computing devices, such as cell phones, mobile phones, tablet computers, wearable computers, gaming devices, personal digital assistants (PDAs) and the like.

The storage device 1008 is a non-transitory computer-readable storage medium such as a hard drive, compact disk read-only memory (CD-ROM), DVD, or a solid-state memory device. The memory 1006 holds instructions and data used by the processor 1002. The pointing device 1014 is used in combination with the keyboard 1010 to input data into the computer system 1000. The graphics adapter 1012 displays images and other information on the display device 1018. In some embodiments, the display device 1018 includes a touch screen capability (i.e., employing capacitive or resistive touch sensing) for receiving user input and selections. The network adapter 1016 couples the computing device 1000 to a network, such as the internet. Other embodiments of the computing device 1000 may have different and/or other components than those shown in FIG. 10.

In some embodiments, steps for calculating motion aligned distances are implemented as one or more modules. As used herein, the term "module" refers to computer program instructions and/or other logic used to provide the specified functionality. Thus, a module can be implemented in hardware, firmware, and/or software. In an embodiment, program modules formed of executable computer program instructions are stored on the storage device 1008, loaded into the memory 1006, and executed by the processor 1002 as one or more processes.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 2 and 10. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 200, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for executing a motion aligned distance calculation and determining recognition results for input images through the disclosed principles herein. Thus, while particular embodiments and applications have been illustrated and described, it is to be understood that the disclosed embodiments are not limited to the precise construction and components disclosed herein. Various modifications, changes and variations, which will be apparent to those persons having skill in the art, may be made in the arrangement, operation and details of the method and apparatus disclosed herein without departing from the spirit and scope defined in the appended claims.

What is claimed is:

1. A computer-implemented method comprising:
    detecting a facial image in an input image, the input image received by a detection module;
    calculating a distance between the input image and a reference image, the reference image retrieved from a reference image database and the reference image containing a known facial image for aiding recognizing detected facial images;
    executing, in response to determining the distance calculated is within a predetermined threshold, a motion aligned distance calculation comprising:
        identifying a center point for each of the input image and the reference image;
        splitting the input image and the reference image into blocks based on the center point of the input image and the center point of the reference image, respectively;
        determining a motion field for aligning the input image with the reference image, the motion field comprising, for a pair of corresponding blocks of the input image and the reference image, at least one vector corresponding to a modification of a portion of the facial image within a first block in the pair of corresponding blocks to shift the portion of the facial image within the first block to align with a corresponding portion of the facial image within a second block in the pair of corresponding blocks; and
        aligning the input image with the reference image based on the motion field;
        calculating a motion aligned distance between the input image and the reference image based on the motion field; and
    providing, in response to the motion aligned distance calculated, a recognition result for the input image.

2. The method of claim 1, wherein the detecting the facial image is based in part on a detection of facial features comprising of one or more of the following: eyes, nose, mouth, ears, or facial outline.

3. The method of claim 1, wherein the facial image is normalized, downscaled, rescaled, or a combination thereof.

4. The method of claim 3, wherein normalizing comprises normalizing size scale, orientation, brightness, contrast, or a combination thereof.

5. The method of claim 3, wherein downscaling comprises a reduction of image size, quality, or a combination thereof.

6. The method of claim 1, wherein calculating distances uses a discrete cosine transform.

7. The method of claim 1, wherein the center point comprises: a physical center of an image, a common facial feature, or a point determined by a normalization process.

8. The method of claim 1, wherein the splitting the input image and the reference image comprises dividing each image into specifically sized sections.

9. The method of claim 1, wherein the determining the motion field comprises:
    matching the corresponding blocks between the input image and the reference image based on common features;
    calculating coefficients for each coordinate on the input image based on differences between the corresponding blocks; and
    comparing the coefficients with a second predetermined threshold value and if greater than the second predetermined threshold value:
        calculating motion field vector parameters; and
        calculating a motion field distance based on an average sum of motion field vectors.

10. The method of claim 1, wherein the calculating the motion aligned distance comprises:
    determining a scale factor;
    generating affine transformation matrices;
    dividing the reference image into parts;
    calculating distances between regions in the input image to the parts of the reference image;
    calculating normalizing coefficients based on each region; and
    calculating a precise distance between the input image and the reference image based on the normalizing coefficients and the distances between the regions.

11. The method of claim 10, wherein the determining the scale factor comprises:
    obtaining scale parameters;
    generating a set of scaled images;
    calculating motion field distances between a scaled input image and reference images;

determining a best distance from a set of calculated motion field distances; and selecting the scale factor that produced the best distance.

12. The method of claim 10, wherein the determining affine transformation matrices comprises:

obtaining a downscaled input image and reference images;

generating a first affine transformation matrix based on a best scale factor;

resizing the input image based on the scale factor;

calculating a first motion field for the resized input image and the reference images;

generating a second affine transformation matrix based on the calculated first motion field;

calculating a third affine transformation matrix based on a convolution of the first affine transformation matrix and the second affine transformation matrix;

applying the third affine transformation matrix to the downscaled input image to produce a transformed input image;

calculating a second motion field for the transformed input image and the reference images;

generating a fourth affine transformation matrix based on the calculated second motion field; and calculating a fifth affine transformation matrix based on a convolution of the third affine transformation matrix and the fourth affine transformation matrix.

13. The method of claim 10, wherein the parts comprise three regions: eyes, nose, and mouth.

14. An image processor system, embodied in a mobile computing device, for identifying a facial image, the system comprising:

a detection module configured to detect the facial image in an input image;

a reference image database configured to store a reference image;

a distance calculator module configured to calculate a distance between the input image and the reference image, the reference image containing a known facial image for aiding recognizing detected facial images; and a motion field module configured to calculate a plurality of vectors in a motion field to align the input image with the reference image, the calculation through the motion field module further configured to:

identify a center point for each of the input image and the reference image;

split the input image and the reference image into blocks based on the center point of the input image and the center point of the reference image, respectively;

determine, for each pair of corresponding blocks of the input image and the reference image, at least one vector in the motion field corresponding to a modification of a portion of the facial image within a first block in a pair of corresponding blocks to shift the portion of the facial image within the first block to align with a corresponding portion of the facial image within a second block in the pair of corresponding blocks; and align the input image with the reference image based on the motion field.

15. The system of claim 14, wherein a second distance calculated by the distance calculator module based on the aligned input image is a motion aligned distance.

16. The system of claim 14, further comprising:

a normalization module configured to normalize facial images, based in part on at least one of the following: orientation, scale, brightness, or contrast; and a downscale module configured to modify an image by reducing image size, reducing image quality, or a combination thereof.

17. The system of claim 14, wherein the motion field module is further configured to:

match the corresponding blocks between the input image and the reference image based on common features;

calculate coefficients for each coordinate on the input image based on differences between the corresponding blocks;

compare the coefficients with a second predetermined threshold value and if greater than the second predetermined threshold value;

calculate motion field vector parameters; and calculate a motion field distance based on an average sum of motion field vectors.

18. The system of claim 14, wherein the image processor system further comprises a scale module configured to determine a scale factor, a determination through the scale module configured to:

obtain scale parameters;

generate a set of scaled images;

calculate motion field distances between a scaled input image and reference images;

determine a best distance from a set of motion field distances; and select the scale factor that produced the best distance.

19. The system of claim 14, wherein the image processor system further comprises an affine transformation module configured to calculate an affine transformation matrix, a calculation through the affine transformation module configured to:

obtain a downscaled input image and reference images;

generate a first affine transformation matrix based on a best scale factor;

resize the input image based on the scale factor;

calculate a first motion field for the resized input image and the reference images;

generate a second affine transformation matrix based on the first motion field;

calculate a third affine transformation matrix based on a convolution of the first affine transformation matrix and the second affine transformation matrix;

apply the third affine transformation matrix to the downscaled input image to produce a transformed input image;

calculate a second motion field for the transformed input image and the reference images;

generate a fourth affine transformation matrix based on the second motion field; and calculate a fifth affine transformation matrix based on a convolution of the third affine transformation matrix and the fourth affine transformation matrix.

20. The system of claim 14, wherein the distance calculator module is configured to:

divide the reference image into parts;

calculate distances between regions in the input image to the parts of the reference image;

calculate normalizing coefficients based on each region; and calculate a precise distance between the input image and the reference image based on the normalizing coefficients and the distances between the regions.

21. A computer-implemented method comprising:

detecting a type of object in an input image, the input image received by a detection module;

calculating a distance between the input image and a reference image, the reference image retrieved from a reference image database and the reference image containing a known type of object for aiding recognizing detected objects;

executing, in response to determining the distance calculated is within a predetermined threshold, a motion aligned distance calculation comprising:

identifying a center point for each of the input image and the reference image;

splitting each of the input image and the reference image into blocks based on the center point of the input image and the center point of the reference image, respectively;

determining a motion field for aligning the input image with the reference image, the motion field comprising, for a pair of corresponding blocks of the input image and the reference image, at least one vector corresponding to a modification of a portion of the object within a first block in the pair of corresponding blocks to shift the portion of the object within the first block to align with a corresponding portion of the object within a second block in the pair of corresponding blocks;

aligning the input image with the reference image based on the motion field;

calculating a motion aligned distance between the input image and the reference image based on the motion field; and providing, in response to the motion aligned distance calculated, a recognition result for the input image.

22. The method of claim 21, wherein the determining the motion field comprises:

matching the corresponding blocks between the input image and the reference image based on common features;

calculating coefficients for each coordinate on the input image based on differences between the corresponding blocks; and comparing the coefficients with a second predetermined threshold value and if greater than the second predetermined threshold value:

calculating motion field vector parameters; and calculating a motion field distance based on an average sum of motion field vectors.

23. The method of claim 21, wherein the calculating the motion aligned distance comprises:

determining a scale factor;

generating affine transformation matrices;

dividing the reference image into parts;

calculating distances between regions in the input image to the parts of the reference image;

calculating normalizing coefficients based on each region; and calculating a precise distance between the input image and the reference image based on the normalizing coefficients and the distances between the regions.

24. The method of claim 23, wherein the determining the scale factor comprises:

obtaining scale parameters;

generating a set of scaled images;

calculating motion field distances between a scaled input image and reference images;

determining a best distance from a set of calculated motion field distances; and selecting the scale factor that produced the best distance.

25. The method of claim 23, wherein the determining affine transformation matrices comprises:

obtaining a downscaled input image and reference images;

generating a first affine transformation matrix based on a best scale factor;

resizing the input image based on the scale factor;

calculating a first motion field for the resized input image and the reference images;

generating a second affine transformation matrix based on the calculated first motion field;

calculating a third affine transformation matrix based on a convolution of the first affine transformation matrix and the second affine transformation matrix;

applying the third affine transformation matrix to the downscaled input image to produce a transformed input image;

calculating a second motion field for the transformed input image and the reference images;

generating a fourth affine transformation matrix based on the calculated second motion field; and calculating a fifth affine transformation matrix based on a convolution of the third affine transformation matrix and the fourth affine transformation matrix.

\* \* \* \* \*